US008063880B2

United States Patent
Chen et al.

(10) Patent No.: US 8,063,880 B2
(45) Date of Patent: *Nov. 22, 2011

(54) MOBILE DEVICE CUSTOMIZER

(75) Inventors: Elaine Chen, Arlington, MA (US);
Lorraine Wheeler, Billerica, MA (US);
Beth Marcus, Bedford, MA (US)

(73) Assignee: Zeemote Technology Inc, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/693,398

(22) Filed: Jan. 25, 2010

(65) Prior Publication Data

US 2011/0018793 A1    Jan. 27, 2011

Related U.S. Application Data

(63) Continuation of application No. 11/519,435, filed on Sep. 11, 2006, now Pat. No. 7,652,660, which is a continuation-in-part of application No. 11/249,009, filed on Oct. 11, 2005, now Pat. No. 7,280,097.

(51) Int. Cl.
*G09G 5/00* (2006.01)
(52) U.S. Cl. ..................... 345/156; 345/169
(58) Field of Classification Search ............... 345/156, 345/157, 163, 168, 169, 173
See application file for complete search history.

(56) References Cited

U.S. PATENT DOCUMENTS

| 4,793,312 | A | 12/1988 | Doinaga et al. |
|---|---|---|---|
| 4,867,028 | A | 9/1989 | Jones |
| 4,891,777 | A | 1/1990 | Lapeyre |
| 4,896,554 | A | 1/1990 | Culver |
| 4,912,462 | A | 3/1990 | Washizuka et al. |
| 5,189,416 | A | 2/1993 | Estes |
| 5,287,514 | A | 2/1994 | Gram |
| 5,365,589 | A | 11/1994 | Gutowitz |
| 5,432,510 | A | 7/1995 | Matthews |

(Continued)

FOREIGN PATENT DOCUMENTS

DE    298 23 417 U1    5/1999

(Continued)

OTHER PUBLICATIONS

Sony Ericsson Mobule Communications AB, "Developers Guideline Bluetooth HID Remote Control (K700 Series, S700 Series, V800 Series)" Internet Citation, [Online] Oct. 2004 XP007901961, Retrieved from the Internet at URL:http://mybox.trenger.ro/{torgeir/dg_hid_bt_r2b.pdf> [retrieved on Apr. 11, 2007].

(Continued)

*Primary Examiner* — Ricardo L Osorio
(74) *Attorney, Agent, or Firm* — Mauriel Kapouytian & Treffert LLP; Michael Mauriel

(57) ABSTRACT

A method and system for customizing a mobile host device is disclosed. An accessory device for interfacing with and customizing a mobile host device includes a communication channel designed to establish a bi-directional communication link between the accessory device and the host device. The accessory device also includes a processor communicatively coupled to the communication channel. The processor is designed to execute a plurality of applications. In addition, the accessory device includes an input assembly communicatively coupled to the processor. The input assembly is designed to minimize a total number of input elements included in the input assembly. Further, at least a first input element being selectively mapped to one or more input functions of the host device based on a user selection.

16 Claims, 18 Drawing Sheets

U.S. PATENT DOCUMENTS

| | | | |
|---|---|---|---|
| 5,473,325 | A | 12/1995 | McAlindon |
| 5,512,919 | A | 4/1996 | Araki |
| 5,515,305 | A | 5/1996 | Register et al. |
| 5,561,712 | A | 10/1996 | Nishihara |
| 5,612,690 | A | 3/1997 | Levy |
| 5,782,642 | A | 7/1998 | Goren |
| 5,824,931 | A | 10/1998 | Papadopoulos |
| 5,825,362 | A | 10/1998 | Retter |
| 5,859,629 | A | 1/1999 | Tognazzini |
| 5,900,864 | A | 5/1999 | Macdonald |
| 5,943,054 | A | 8/1999 | Hirano et al. |
| 5,973,621 | A | 10/1999 | Levy |
| 6,005,496 | A | 12/1999 | Hargreaves et al. |
| 6,084,576 | A | 7/2000 | Leu et al. |
| 6,094,197 | A | 7/2000 | Buxton et al. |
| 6,107,988 | A | 8/2000 | Phillipps |
| 6,115,028 | A | 9/2000 | Balakrishnan et al. |
| 6,184,804 | B1 | 2/2001 | Harrison |
| 6,219,731 | B1 | 4/2001 | Gutowitz |
| 6,228,709 | B1 | 5/2001 | Hsieh |
| 6,232,956 | B1 | 5/2001 | Mailman |
| 6,297,752 | B1 | 10/2001 | Ni |
| 6,339,706 | B1 | 1/2002 | Tillgren et al. |
| 6,377,685 | B1 | 4/2002 | Krishnan |
| RE37,723 | E | 6/2002 | Goren |
| 6,461,238 | B1 | 10/2002 | Rehkemper et al. |
| 6,489,976 | B1 | 12/2002 | Patil et al. |
| 6,512,511 | B2 | 1/2003 | Willner et al. |
| 6,520,699 | B2 | 2/2003 | Abe |
| 6,541,715 | B2 | 4/2003 | Swanson |
| 6,542,091 | B1 | 4/2003 | Rasanen |
| 6,546,239 | B1 | 4/2003 | Pazdersky et al. |
| 6,573,844 | B1 | 6/2003 | Venolia et al. |
| 6,606,486 | B1 | 8/2003 | Cubbage et al. |
| 6,615,299 | B1 | 9/2003 | Chu et al. |
| 6,622,018 | B1 | 9/2003 | Erekson |
| 6,654,733 | B1 | 11/2003 | Goodman et al. |
| 6,703,963 | B2 | 3/2004 | Higginson |
| 6,738,045 | B2 | 5/2004 | Hinckley et al. |
| 6,741,235 | B1 | 5/2004 | Goren |
| 6,760,013 | B2 | 7/2004 | Willner et al. |
| 6,865,718 | B2 | 3/2005 | Levi |
| 6,885,317 | B1 | 4/2005 | Gutowitz |
| 6,885,318 | B2 | 4/2005 | Bickerton |
| 6,909,424 | B2 | 6/2005 | Liebenow et al. |
| 6,911,608 | B2 | 6/2005 | Levy |
| 6,947,028 | B2 | 9/2005 | Shkolnikov |
| 6,954,355 | B2 | 10/2005 | Gerstner et al. |
| 6,980,200 | B2 | 12/2005 | Goren |
| 7,020,499 | B2 | 3/2006 | Moffi et al. |
| 7,072,975 | B2 | 7/2006 | Kato |
| 7,092,734 | B2 | 8/2006 | Herle et al. |
| 7,138,902 | B2 | 11/2006 | Menard |
| 7,142,980 | B1 | 11/2006 | Laverick et al. |
| 7,215,279 | B1 | 5/2007 | Poindexter et al. |
| 7,221,250 | B2 | 5/2007 | Yoshida et al. |
| 2002/0023265 | A1 | 2/2002 | Metcalf |
| 2002/0163504 | A1 | 11/2002 | Pallakoff |
| 2002/0175896 | A1 | 11/2002 | Vaananen et al. |
| 2003/0003907 | A1 | 1/2003 | Lai et al. |
| 2003/0020692 | A1 | 1/2003 | Griffin et al. |
| 2003/0048205 | A1 | 3/2003 | He |
| 2003/0061103 | A1 | 3/2003 | Kanai |
| 2003/0083114 | A1 | 5/2003 | Lavin et al. |
| 2003/0095156 | A1 | 5/2003 | Klein et al. |
| 2003/0095288 | A1 | 5/2003 | Hung et al. |
| 2003/0169188 | A1 | 9/2003 | Chang |
| 2003/0193418 | A1 | 10/2003 | Shi |
| 2004/0107303 | A1 | 6/2004 | Mulligan |
| 2004/0140617 | A1 | 7/2004 | Cordell |
| 2004/0208681 | A1 | 10/2004 | Dechene |
| 2005/0093846 | A1 | 5/2005 | Marcus et al. |
| 2006/0129951 | A1 | 6/2006 | Vaananen et al. |
| 2006/0294567 | A1 | 12/2006 | Ting |
| 2008/0009310 | A1 | 1/2008 | Rhoads et al. |

FOREIGN PATENT DOCUMENTS

| | | | |
|---|---|---|---|
| EP | 0 251 477 | A2 | 1/1988 |
| EP | 0585730 | A1 | 3/1994 |
| EP | 1103883 | A2 | 5/2001 |
| EP | 1 253 547 | A2 | 10/2002 |
| EP | 1293882 | A2 | 3/2003 |
| EP | 1 376 319 | A1 | 1/2004 |
| WO | WO 91/05303 | A1 | 4/1991 |
| WO | WO 92/15083 | A1 | 9/1992 |
| WO | WO 00/10077 | A2 | 2/2000 |
| WO | WO 03/007117 | A2 | 1/2003 |
| WO | WO 03/042805 | A1 | 5/2003 |
| WO | WO 03/052948 | A1 | 6/2003 |
| WO | WO 2004/019315 | A1 | 3/2004 |

OTHER PUBLICATIONS

Zawinski, J., "XKeyCaps"[O nline], Dec. 12, 1999, XP002421133, Retrieved from the Internet: URL: http://www.jwz.org/xkeycaps/>, pp. 1-3.

Zawinski, J., "XKeyCaps Manual"[Online], Dec. 12, 1999, XP002421293, Retrieved from the Internet: URL: http://www.jwz.org/xkeycaps/man.html>, pp. 1-14.

Open Source Technology Group: "Project Details for XKeyCaps"[Online], Jan. 1, 2006, XP002421134, Retrieved from the Internet: URL: http://freshmeat.net/projects/xkeycaps, pp. 1-2.

The XFREE86 Project, Inc: "XMODMAP(I) manual page"[Online], Jan. 18, 2002, XP002421135, Retrieved from the Internet: URL: http://www.xfree86.org/4.2.0/xmodmap.1.html>, pp. 1-5.

The XFREE86 Project, Inc: "XFree86 Release 4.2.1"[Online], May 8, 2006, XP002421136, Retrieved from the Internet: URL: http://www.xfree86.org/releases/rel420.html>, pp. 1-2.

Toman, K. and; Pascal, I. U., "How to Further Enhance XKB Configuration"[Online], Nov. 25, 2002, XP002421137, Retrieved from the Internet: URL: http://www.xfree86.org/4.5.0/XKB-Enhancing.pdf>, pp. 1-9.

Buxton, W., "A Directory of Sources for Input Technologies", May 12, 2006, retrieved from the internet at http://www.billbuxton.com/InputSources.html on Jan. 10, 2007.

Roche, et al., "Managing Content-Initiated Application Delivery with a Client-Side Agent", Proceedings of the 2nd IASTED International Conference Communications, Internet and Information Technology, Nov. 17-19, 2003, Scottsdale, Arizona, USA, pp. 334-339.

"Verizon to launch mobile chaperone service", Reuters, published on ZDNet News: Jun. 10, 2006, retrieved from the internet http://news.zdnet.com, Nov. 3, 2006.

"Hasbro introduces CHATNOW! Now Tweens Can Talk, Send Text Messages and Take Photographs with No Airtime Charges or Calling Plan", Feb. 10, 2005; retrieved from the internet http://www.hasbro.com/media/content/printable.cfm?release=290, Nov. 9, 2006.

"Family Center Family Locator" "Locate your Kid's phone with GPS technology" retrieved from the internet, http://www.disneymobile.go.com/disneymobile/home.do?C<P=KAC-GOOG_SEM, Nov. 9, 2006.

"Are you ever worried where your children are?" Child Locate, retrieved from the internet, http://www.childlocate.co.uk, Nov. 3, 2006.

"Frequently Asked Questions", Child Locate, retrieved from the internet, http://www.childlocate.co.uk/faq.html, Nov. 3, 2006.

"About Sprint Family Locator", retrieved from the Internet, https://sfl.sprintpcs.com/finder-sprint-family/signIn.html, Nov. 3, 2006.

"Welcome to Kidswireless.com; RAZR and Migo Verizon Family Plan", retrieved from the internet http://www.kidswireless.com/phone/RAZR-and-Migo, Nov. 3, 2006.

"Welcome to Kidswireless.com; LG Migo Verizon Wireless" retrieved from the internet http://www.kidswireless.com/phones/LG-Mio-, Nov. 3, 2006.

"Welcome to Kidswireless.com; Verizon Chaperone and Child Zone", retrieved from the internet http://ww.kidswireless.com/articles/verizon-wireless-chaperon/, Nov. 3, 2006.

"Teletrac Partners with Ryder and Cingular in Fleet Management Offering", retrieved from the internet http://www.gpsworld.com/gpslbs/article/articleDetail.jsp?id=359057, Nov. 3, 2006.

"Never Lose Your Children at the Mall Again", retrieved from the internet http://www.brickhousesecurity.com/vbsik.html, Nov. 3, 2006.

"Child Locator—$30 Child Personal Safety Alarm", retrieved from the internet http://www.mypreciouskid.com/child-locator.html, Nov. 3, 2006.

"Alarm—Personal Alarm", retrieved from the internet http://www.mypreciouskid.com/alarm.html, Nov. 3, 2006.

"Special Needs Children—Children with Special Needs", retrieved from the internet http://www.mypreciouskid.com/special-needs-children.html, Nov. 3, 2006.

"Never lose track of your pet", retrieved from the internet http://www.globalpetfinder.com, Nov. 3, 2006.

"Gadgets track pets with GPS or transfer tapes to DVDs", retrieved from the internet https://www.globalpetfinder.com/article39.html, 11,Mar. 2006.

"TrimTracXS Internet GPS Car Tracking System—Real Time GPS Tracking", retrieved from the internet http://www.brickhousesecurity.com/slimtrak-realtime-gps-tracking-car-locator.html, Nov. 3, 2006.

"SecureTrack GPS Tracking Child Locator—Teen Tracking", retrieved from the internet http://www.brickhousesecurity.com/geminitracking-gps-child-locator.html, Nov. 3, 2006.

"Cingular Firefly Phone—FREE from Kids Wireless.com", retrieved from the internet http://www.kidswireless.com/phones/Firefly, Nov. 3, 2006.

"Sprint Family Locator Program: Locating your Children via Phone GPS", retrieved from the internet http://www.kidswireless.com/articles/family-locator-program, Nov. 3, 2006.

"TicTalk Parental Controlled Cell Phone—Cell Phone for Kids", retrieved from the internet http://www.mytictalk.com/Leapfrog/, Nov. 3, 2006.

"tiger—chatnowabout", retrieved from the internet http://www.hasbro.com/tiger/default.cfm?page=chatnowabout, Nov. 3, 2006.

"TicTalk Parent Controlled Cell Phone" user manual, 2005 Enfora© L.P.

Buxton, B., "A Directory of Sources for Input Technologies," Input Devices Sources & Resources, Oct. 1, 2003, retrieved from the internet at http://www.billbuxton.com/InputSources.html, on Oct. 31, 2003, pp. 1-48.

Brooks, M., "Introducing the Dvorak Keyboard," Jul. 8, 2000, retrieved from the internet at http://www.mwbrooks.com/dvorak, on Oct. 31, 2003, pp. 1-2.

Cirque Pocket Keyboard, "Pocket Keyboard," Innovative Ergonomic Solutions, retrieved from the internet at http://www.iesproducts.com/key-misc-pocket.html, on Oct. 31, 2003, pp. 1-2.

Buxton, W., et al., "Human Input to Computer Systems: Theories, Techniques and Technology," 2002, retrieved from the Internet at http://billbuxton.com/inputManuscript.htlm, on Oct. 31, 2003, pp. 1-4.

Buxton, "An Introduction to Human Input to Computers", Apr. 6, 1999, found on the internet at http://www.billbuxton.com/input01.Introduction.pdf.

Unidentified and Undated Document discussing alternative designs to QWERTY Keyboard, pp. 2-10.

Donner, J., "Research Approaches to Mobile Use in Developing World: A Review of the Literature.," International Conference on Mobile Communication and Asian Modernities City University of Hong Kong, Jun. 7-8, 2005, pp. 1-20.

Lin, M. et al, "Graphics Matter: A Case Study of Mobile Phone Keypad Design for Chinese Input," CHI 2005, Late Breaking Results: Posters, Portland, Oregon. Apr. 2-7, 2005, pp. 1593-1596.

MacKenzie, S., et. al., "Text Entry for Mobile Computing: Models and Methods, Theory and Practice," Human-Computer Interaction, vol. 17, pp. 147-198, found on the internet at http://www.yorku.ca/mack/hci3-2002.pdf.

Starner, T., "Keyboards Redux: Fast Mobile Text Entry". Pervasive Computing, Jul.-Sep. 2004, pp. 97-101, found on the internet at http://www.cc.gatech.edu/fac/Thad.Starner/p/magazine/2004-3-keyboard-redux.pdf.

Butts, L., et al., An Evaluation of Mobile Phone Text Input Methods,: Third Australasian Conference on User Interfaces, Jan. 1, 2002, Melbourne, Victoria, Australia, pp. 55-59, found on the internet at http://www.crpit.com/confpapers/CRPITV7Butts.pdf.

Wigdor, D., "Chording and Tilting for Rapid, Unambiguous Text to Mobile Phone," 2004, pp. 1—describes chordtap and tilttap (also covered in depth in the paper referenced below) found on the internet at http://www.dgp.toronto.edu/~dwigdor/research/thesis/submitted.html.

Wigdor, D., et al., "A Comparison of Consecutive and Concurrent Input Text Entry Techniques for Mobile Phones," Conference on Human Factors, Apr. 24-29, 2004, vol. 6, No. 1, pp. 81-88, found on the internet at http://portal.acm.org/citation.cfm?id=985703 http://www.dgp.toronto.edu/~ravin/papers/chi2004_concurrenttextinput.pdf.

Oniszczak, A., et. al, "A Comparison of Two Input Methods for Keypads on Mobile Devices," Proceedings of NordiCHI 2004, pp. 101-104. New York: ACM, found on the internet at http://www.yorku.ca/mack/nordichi2004.pdf.

Lyons, K., "Everyday Wearable Computer Use: A Case Study of an Expert User," In Proceedings of Mobile HCI 2003, pp. 61-75, 2003, found on the internet at http://www.cc.gatech.edu/ccg/publications/everyday_case.pdf.

Lyons, K., etl al., "Twiddler Typing: One-Handed Chording Text Entry for Mobile Phones," Proc. Conf. Human Factors in Computing Systems (SIGCHI 01), ACM Press, 2004, pp. 671-678, found on the internet at http://www.cc.gatech.edu/fac/Thad.Starner/p/030_10_MTE/twiddler-chi04.pdf.

Wigdor, D., et al., "TiltText: Using Tilt for Text Input to Mobile Phones," Proceedings of the 16th Annual ACM Symposium on User Interface Software and Technology, Nov. 2-5, 2003, Vancouver, Canada, pp. 81-90, found on the internet at http://portal.acm.org/citation.cfm?id=964705 http://www.dgp.toronto.edu/~ravin/papers/uist2003_tilttext.pdf.

Dunlop, M. D., et al., "Dictionary Based Text Entry Method for Mobile Phones," Proceedings of Second Workshop on Human Computer Interaction with Mobile Devices, Aug. 1999, pp. 1-4, found on the internet at http://www.cis.strath.ac.uk/~mdd/research/publications/99dunlopcrossan.pdf.

Pavlovych, A., et al., "Less-Tap: A Fast and Easy-To-Learn Text Input Technique for Phones," Graphics Interface 2003, 97-104, found on the internet at http://www.graphicsinterface.org/cgi-bin/DownloadPaper?name=2003/170/paper170.pdf.

MacKenzie, S. et al. , "Letterwise: Prefix-Based Disambiguation for Mobile Text Input," Proceedings of the 14th Annual ACM Symposium on User Interface Software and Technology, Nov. 11-14, 2001, Orlando, Florida.

Kober, H., et al., "Linguistically Optimized Text Entry on a Cell Phone," In Proceedings of the CHI 2001, found on the internet at http://www.eatoni.com/research/chi.pdf.

Goldstein, M., et al., "The Finger-Joint-Gesture Wearable Keypad," Ericsson Radio Systems AB., pp. 9-18.

Rosenberg, R., "Computing without Mice and Keyboards: Text and Graphic Input Devices for Mobile Computing," Ph.D. Thesis, Dept. of Computer Science, University College, London, 1998, pp. 1-201, found on the internet at http://www.obscure.org/rosenberg/.

MacKay, B., et al., "Walk 'N Scroll: A Comparison of Software-Based Navigation Techniques for Different Levels of Mobility," In Proceedings of the 7th international Conference on Human Computer interaction with Mobile Devices &Amp; Services (Salzburg, Austria, Sep. 19-22, 2005). MobileHCI '05, vol. 111. ACM Press, New York, NY, pp. 183-190, found on the internet at http://portal.acm.org/citation.cfm?id=1085808&coll=GUIDE&dl=GUIDE&CFID=66591340&CFTOKEN=6294934.

Kranz, M., et al., "DistScroll—A New One-handed Interaction Device," In Proceedings of the 5th International Workshop on Smart Appliances and Wearable Computing, Jun. 10, 2005, found on the internet at http://www.hcilab.org/documents/DistScroll1AnewOneHandedInteractionDevice-KranzHolleisSchmidt-IWSAWC2005.pdf.

Fallmana, D., et al., "ScrollPad: Tangible Scrolling with Mobile Devices," Proceedings of the Proceedings of the 37th Annual Hawaii International Conference on System Sciences (HICSS'04)—Track 9, p. 90286.3, Jan. 5-8, 2004. http://portal.acm.org/citation.cfm?id=963347&coll=GUIDE&dl=GUIDE&CFID=66483658&CFTOKEN=36023921, found on the internet at http://daniel.fallman.org/resources/papers/fallman-hicss37.pdf.

Chipman, L. E., et al., "SlideBar: Analysis of a Linear Input Device," Behav. Inf. Tech. 23, 1 (Jan. 2004), pp. 1-10, found on the internet at http://portal.acm.org/citation.cfm?id=993182.993184# http://www.cs.umd.edu/Library/TRs/CS-TR-4471/CS-TR-4471.pdf.

Darnauer, J., "Orientation-based interaction for Mobile Devices," Stanford University, pp. 1-4, found on the internet at http://hci.stanford.edu/srk/cs377a-mobile/project/final/darnauer-garrity-kim.pdf.

Rekimoto, J., "Tilting Operations for Small Screen Interfaces (Tech Note)," Proceedings of the 9th annual ACM symposium on User Interface software and technology, Nov. 6-8, 1996, Seattle, pp. 167-168, found on the internet at http://portal.acm.org/citation.cfm?id=237115&coll=GUIDE&dl=GUIDE&CFID=66483658&CFTOKEN=36023921.

Hinckley, K., et, al., "Foreground and Background Interaction with Sensor-enhanced Mobile Devices," ACM TOCHI (Transactions on Computer-Human Interaction) Special Issue on Sensor-Based Interaction, vol. 12, No. 1, Mar. 2005, pp. 1-22, found on the internet at http://portal.acm.org/citation.cfm?id=1057240&coll=GUIDE&dl=GUIDE&CFID=66591340&CFTOKEN=6294934.

Hinckley, K., et al., "Quantitative Analysis of Scrolling Techniques," In Proceedings of the SIGCHI Conference on Human Factors in Computing Systems: Changing Our World, Changing Ourselves (Minneapolis, Minnesota, USA, Apr. 20-25, 2002). CHI '02. ACM Press, New York, NY, vol. 4, No. 1, pp. 65-72, http://doi.acm.org/10.1145/503376.503389.

Harrison, B. L., et. al., "Squeeze Me, Hold Me, Tilt me! An Exploration of Manipulative User Interfaces," In Proceedings of the SIGCHI Conference on Human Factors in Computing Systems (Los Angeles, California, United States, Apr. 18-23, 1998). C. Karat, A. Lund, J. Coutaz, and J. Karat, Eds. Conference on Human Factors in Computing Systems. ACM Press/Addison-Wesley Publishing Co., New York, NY, pp. 17-24, found on the internet at http://portal.acm.org/citation.cfm?id=274647&coll=Portal&dl=GUIDE&CFID=66588306&CFTOKEN=73460863&CFID=66588306&CFTOKEN=73460863#.

Kawachiya, K., et al., "NaviPoint: An Input Device for Mobile Information Browsing," Proceedings of the SIGCHI conference on Human factors in computing systems, Apr. 18-23, 1998, Los Angeles, California, United States, pp. 1-8, found on the internet at http://portal.acm.org/citation.cfm?id=274645&coll=Portal&dl=GUIDE&CFID=66588306&CFTOKEN=73460863.

Hinkley, K., et al., "Sensing Techniques for Mobile Interaction," UIST 2000: ACM Symposium on User Interface Software and Technology, CHI Letters, vol. 2 No. 2, pp. 91-100, found on the internet at http://portal.acm.org/citation.cfm?id=354417&coll=GUIDE&dl=GUIDE&CFID=66483658&CFTOKEN=36023921.

Baillie, L., et al., "Rolling, Rotating and Imagining in a Virtual Mobile World," In Proceedings of the 7th international Conference on Human Computer interaction with Mobile Devices &Amp; Services (Salzburg, Austria, Sep. 19-22, 2005). MobileHCI '05, vol. 111. ACM Press, New York, NY, pp. 283-286, found on the internet at http://doi.acm.org/10.1145/1085777.1085833.

Karlson, A. K., et al. "AppLens and LaunchTile: Two Designs for One-Handed Thumb Use on Small Devices," pp. 1-12, found on the internet at http://hcil.cs.umd.edu/trs/2004-37/2004-37.html.

Roto, V., "Browsing on Mobile Phones," Nokia Research., found on the internet at http://www.research.att.com/~rjana/WF12_Paper1.pdf.

Buchanan, L., "The Future of Mobile?" Qualcomm Slingshot, pp. 1-3, found on the internet at http://wireless.ign.com/articles/657/657041p1.html.

Whenham, T. O. "Source: New Launches," Dec. 12, 2005, p. 1, found on the internet at http://www.mobilemag.com/content/100/345/C5578/.

Pilato, F., Kyocera Candid KX16, Aug. 8, 2005, p. 1, found on the internet at http://www.mobilemag.com/content/100/340/C4392/.

"Gaming on the go with EXG," XEG Mobile Phone Pad, Nov. 10, 2005, pp. 1-8, found on the internet at http://us.gizmodo.com/gadgets/cellphones/gaming-on-the-go-with-xeg-136414.php http://www.akihabaranews.com/en/news-10615-XEG%2C+the+mobile+phone+pad.html.

Samsung Game Pad—A620, pp. 1-6, found on the internet at http://www.cellphonemall.net/wireless/store/accessorydetail.asp?id=23198&phoneid=334.

Thumbscript®, pp. 1-6, found on the internet at http://www.thumbscript.com/index.html http://www.thumbscript.com/howitworks.html http://www.thumbscript.com/technotes.html.

Exideas, pp. 1-4, found on the internet at http://www.exideas.com/ME/index.html http://www.exideas.com/ME/HardKey.html.

"KeyStick Text Entry System," NE-Ware, pp. 1-21, found on the internet at http://www.n-e-ware.com/Downloads/KeyStick/330/KSUserManual330_01.pdf.

"MobileTouch Product Brief," Synaptics, pp. 12-2, found on the internet at http://www.synaptics.com/products/pdf/mobiletouch_pb.pdf.

"Solutions > Mobile Phones," Atrua: sensor company, pp. 1-3, found on the internet at http://www.atrua.com/s-mobilephones.html.

"Worlds Smallest Joystick for Mobile Devices," Varatouch: Sensor Company, Dec. 22, 2004, p. 1, found on the internet at http://www.esato.com/news/article.php/id=388.

Elektex Smart Fabric Touchpads, Eleksen, pp. 1-2, found on the internet at www.eleksen.com.

"Sharp ZTCJ01 Remote Control for Sharp Mobile Phone," Sharp, Jan. 12, 2005, pp. 1-6, found on the internet at http://www.slashphone.com/93/3123.html.

Killer Cell Phone Game Controller, Oct. 14, 2005, p. 1, found on the internet at http://www.kotaku.com/gaming/cell-phones/killer-cell-phone-game-controller-130968.php.

Combee, B., "Review: CLIE™ Game Controller PEGA-GC10," Oct. 3, 2002. pp. 1-2, found on the internet at http://www.palminfocenter.com/view_story.asp?ID=4295.

"The i-Blue Bluetooth Bluetooth GPS Receiver," Jan. 15, 2006, p. 1, found on the internet at http://mobilitytoday.com/news/005986/mobility_buyGPSnow_i-Blue_bluetooth_GPS.

Alphagrip AG-5 User's Manual, pp. 7, found on the internet at http://www.alphagrips.com/AlphagripAG5UsersManual.pdf.

T9® Adaptive Text Input, pp. 1-4, found on the internet at http://www.tegic.com/pdfs/salessheets/T9%20Adaptive%20Text%20Input%20Sales%20Sheet%201.pdf http://www.tegic.com/pdfs/salessheets/T9%20Adaptive%20Text%20Input%20Sales%20Sheet%202.pdf http://www.tegic.com/pdfs/salessheets/T9%20Adaptive%20Text%20Input%20Sales%20Sheet%203.pdf http://www.tegic.com/pdfs/salessheets/Sloppy%20Type%20Sales%20Sheet.pdf.

Zicorp—eZiTap, pp. 1-3, found on the internet at http://www.zicorp.com/eZiTap.htm.

Motorola—iTAP, p. 1, found on the internet at http://news.zdnet.co.uk/hardware/mobile/0,39020360,39118435,00.htm.

DigitWireless: FastTap, pp. 1-3, found on the internet at http://www.digitwireless.com/flash/download/fastap.pdf.

Microth KeyWheel, pp. 1-4, found on the internet at http://www.microth.com/circumscript/overview.asp.

"One Keypad for All Your Needs," Yuvee. www.yuvee.com, pp. 1-3, found on the internet at http://www.yuvee.com/builtin1.shtml http://www.yuvee.com/built_in_b.shtml http://www.yuvee.com/testdrive2.shtml.

"Twiddler 2 Key Map Download," Sep. 7, 2001, pp. 1-10, found on the internet at http://www.handykey.com/ http://www.handykey.com/Keymap.pdf.

"VRMS—Applications," Sengital Ltd., pp. 1-4, found on the internet at http://sengital.manufacturer.globalsources.com/si/6008823523892/ProductDetail/PDA-keyboard/product_id-1001050135/action-GetProduct.htm.

Howard.co.kr—The mouse phone, p. 1, found on the internet at http://www.howard.co.kr/computer/mouse/mousephone.htm.

Nokia 6620 User Guide, pp. 1-141, found on the internet at http://nds2.nokia.com/files/support/nam/phones/guides/6620_US_en.PDF.

"Sega now into Phones Making? Sure Seems Like It," pp. 1-2, found on the internet at http://www.phoneyworld.com/newspage.aspx?n=1745.

"Phrase-It® User's Guide," Prevalent Devices LLC, pp. 1-33, found on the internet at http://www.prevalentdevices.com/manual3-5-06.pdf.

Kölsch, M., et al., "Keyboards without Keyboards: A Survey of Virtual Keyboards," UCSB Technical Report 2002-21, Jul. 12, 2002, found on the internet at http://www.cs.ucsb.edu/research/tech_reports/reports/2002-21.pdf.

Shin, J. H., et al., "An Improved Alphanumeric Input Algorithm Using Gloves," School of Information and Communication Engineering, Sungkyunkwan University, Suwon, 440-746 Rep. of Korea, pp. 206-212, found on the internet at http://www.complexity.org.au/conference/upload/shin01/shin01.pdf.

Metzger, C., et al., "FreeDigiter: A Contact-Free Device for Gesture Control," Eighth IEEE International Symposium on Wearable Computers (ISWC'04) pp. 1-4, found on the internet at http://www.wirelessrerc.gatech.edu/projects/development/D1files/iswc04-freedigiter.pdf.

Rakkolainen, I., "MobiVR—A Novel User Interface Concept for Mobile Computing," Proceedings of the 4th International Workshop on Mobile Computing, IMC 2003, Jun. 17-18, 2003, Rostock, Germany, pp. 107-112, , found on the internet at http://www.cs.tut.fi/~ira/IMC2003.pdf.

Lumsden, J., et al., "Mobile Note Taking: Investigating the Efficacy of Mobile Text Entry," In Proc. of Mobile Human-Computer Interaction (MobileHCI 2004), Glasgow, UK, Sep. 2004: In S. Brewster and M. Dunlop (Eds.). Mobile Human-Computer-Interaction—MobileHCI 2004, Lecture Notes in Computer Science, vol. 3160, Berlin: Springer, 156—168.

MacKenzie, I. S., et al., "Phrase sets for Evaluating Text Entry Techniques," Extended Abstracts of the ACM Conference on Human Factors in Computing Systems—CHI 2003, pp. 754-755 New York: ACM.

MacKenzie, I. S., "KSPC (Keystrokes per Character) as a Characteristic of Text Entry Techniques," Proceedings of the Fourth International Symposium on Human-Computer Interaction with Mobile Devices, pp. 195-210. Heidelberg, Germany: Springer-Verlag.

Soukoreff, R. W., et al., "Recent Developments in Text-Entry Error Rate Measurement," CHI 2004, Late Breaking Results Paper, Vienna Austria, Apr. 24-29, 2004, pp. 1425-1428.

Lee, S., et al., "Chording as a Text Entry Method in Mobile Phones," In Proceedings of the MobileHCI 2004: 6th International Symposium, Glasgow, UK, Sep. 13-16, 2004, pp. 454-460.

Green, N., et al., "A Reduced QWERTY Keyboard for Mobile Text Entry," In CHI '04 Extended Abstracts on Human Factors in Computing Systems (Vienna, Austria, Apr. 24-29, 2004). CHI '04. ACM Press, New York, NY, pp. 1429-1432, found on the internet at http://portal.acm.org/citation.cfm?id=986082&coll=GUIDE&dl=GUIDE&CFID=66591340&CFTOKEN=6294934.

Partridge, K., et al., "TiltType: Accelerometer-Supported Text Entry for Very Small Devices," Proceedings of the 15th annual ACM symposium on User interface software and technology, Oct. 27-30, 2002, Paris, France, pp. 201-204.

Goldstein, M., "Assessing Two New Wearable Input Paradigms: The Finger-Joint-Gesture Palm-Keypad Glove and the Invisible Phone Clockm," Personal and Ubiquitous Computing, vol. 4, Issue 2/3, 123-133.

Bartlett, J. F., "Rock 'n' Scroll Is Here to Stay," IEEE Comput. Graph. Appl. 20, 3 (May 2000), pp. 40-45, found on the internet at http://portal.acm.org/citation.cfm?id=618728&coll=Portal&dl=GUIDE&CFID=66588306&CFTOKEN=73460863#.

Eslambolchilar, P., et al., "Tilt-Based Automatic Zooming and Scaling in Mobile Devices—A State-Space Implementation," In Proc. of Mobile Human-Computer Interaction (MobileHCI 2004), Glasgow, UK, Sep. 2004: In S. Brewster and M. Dunlop (Eds.). Mobile Human-Computer-Interaction—MobileHCI 2004, Lecture Notes in Computer Science, vol. 3160, Berlin: Springer, pp. 120-131.

Zhai, S., et al., "Improving Browsing Performance: A Study of Four Input Devices for Scrolling and Pointing Tasks," Proceedings of the IFIP TC13 Interantional Conference on Human-Computer Interaction, Jul. 14-18, 1997, pp. 286-293.

Wobbrock, J. O., et al., "WebThumb: Interaction Techniques for Small-Screen Browsers," Proc. UIST, ACM Press (2002), pp. 205-208.

Lee, S., et al., "Designing a Universal Keyboard Using Chording Gloves," SIGCAPH Comput. Phys. Handicap. , 73-74 (Jun. 2002), pp. 142-147, found on the internet at http://doi.acm.org/10.1145/960201.957230.

Pirhonen, A., et al., "Gestural and Audio Metaphors as a Means of Control for Mobile Devices," In Proceedings of the SIGCHI Conference on Human Factors in Computing Systems: Changing Our World, Changing Ourselves (Minneapolis, Minnesota, USA, Apr. 20-25, 2002). CHI '02. ACM Press, New York, NY, pp. 291-298, found on the internet at http://doi.acm.org/10.1145/503376.503428.

Kjeldskov, J., et al. "A Review of Mobile HCI Research Methods," In Proc. of Mobile Human-Computer Interaction (MobileHCI 2003), Udine Italy, Sep. 2003: In L. Chittaro (Ed.). Mobile Human-Computer-Interaction—MobileHCI 2003, Lecture Notes in Computer Science, vol. 2795, Berlin: Springer, pp. 317-335.

Kjeldskov, J., et al., "New Techniques for Usability Evaluation of Mobile Systems," International Journal of Human-Computer Studies, May 2004, 60 (5-6): 599—620.

Robsinson, B., "Battle Test: Belkin SportsCommand," CrunchGear. Blog Archive, Nov. 8, 2006, retrieved from the internet at http://crunchgear.com/2006/11/08/battle-test-belkin-sportscommand/, on Dec. 11, 2006, pp. 1-5.

Eleksen, "Eletek® Powers Fashion-Conscious Professionals with iPod®-enabled Tailored Suit," Sep. 13, 2006, retrieved from the internet at http://www.eleksen.com/?page=news/index.asp&newsID=60, printed on Dec. 11, 2006, pp. 1-2.

Eleksen, "Belkin Selects ElekTex to Power New-to the-Market SportCommand Product," Sep. 19, 2006, retrieved from the internet at http://www.eleksen.com/?page=news/index.asp&newsID=61, on Dec. 11, 2006, pp. 1-2.

XEG, , retrieved from the internet at http://www.xeg.co.kr/xeg/xeguse/xeg_use02_2.htm, on Dec. 12, 2006, pp. 1-8.

TomTom, Portable GPS car navigation systems, "TomTom Navigator 5—Bluetooth," retrieved from the internet at http://www.tomtom.com/products/features.php?ID=103&Category=2&Lid=4, on Dec. 12, 2006, pp. 1-4.

Verizon Wireless, "Bluetooth Portable Accessory," retrieved from the internet at http://www.verizonwireless.com/b2c/store/controller?item=accessoryMart&action=viewBluetoothAccessories&model=Capable%20Devices&make=Bluetooth@reg, on Dec. 12, 2006, p. 1.

"Phonebook Flash Drive", retrieved from the internet at http://mobile.brando.com.hk/PhonebookFlashDrive.php on Feb. 5, 2007, pp. 1-3.

"LifeDrive™ mobile manager" retrieved from the internet http://www.palm.com/us/products/mobilemanagers/lifedrive/details.epl on Feb. 5, 2007, pp. 1-2.

Toshiba Launches Hopbit: Innovative Mobile Pocket Server Combines Bluetoom (TM) Connectivity with High Capacity Data Storage (for the Japanese Market Only), Oct. 9, 2002, retrieved from the internet http://www.toshiba.co.jp/about/press/2002_10/pr0902.html, on Feb. 5, 2007.

"USB Bluetooth Card Reader", retrieved from the internet http://usb.brando.com.hk/prod_detail.php?prod_id=00154%dept_id=015%cat_id=036 on Feb. 5, 2007, pp. 1-3.

Hands-Free Profile (HFP) 1.5, Bluetooth Specification, Nov. 25, 2005, pp. 1-93.

MOBILE DEVICE CUSTOMIZER

This application is a continuation of U.S. patent application Ser. No. 11/519,435, filed Sep. 11, 1006 now U.S. Pat. No. 7,652,660, which is a continuation-in-part to U.S. patent application Ser. No. 11/249,009 (now U.S. Pat. No. 7,280,097), filed on Oct. 11, 2005. The contents of the U.S. patent application Ser. Nos. 11/249,009 and 11/519,435 are incorporated in their entirety by reference. This application is also related to U.S. patent application Ser. No. 10/699,555 (now U.S. Pat. No. 7,218,313), filed on Oct. 31, 2003 and co-pending U.S. patent application Ser. No. 11/221,412, filed Sep. 6, 2005.

BACKGROUND

The following description relates to hand-held input acceleration devices for interfacing with electronic devices, such as cellular phones, personal digital assistants ("PDAs"), pocket personal computers, smart phones, hand-held game devices, bar code readers, MP3 players and other similar input devices having a keypad or one or more input elements, and also relates to human interface and input systems for use with the hand-held acceleration devices.

Electronic devices have become increasingly sophisticated and physically smaller due in part to a decrease in the price of processing power and a concurrent increase in demand by consumers for smaller devices. Such devices, however, tend to be limited in function and utility by the user's ability to interface with the device for data input (e.g., text, numeric, and functional input) and/or device control, which becomes increasingly more difficult to do as the available space on the device's surface for positioning the input elements, which are used for data input and/or device control, continues to decrease.

Moreover, as the use of applications such as text centric applications (e.g., inputting data for e-mail, instant messaging, SMS, and MMS), list navigation applications (e.g. 1-D or 2-D navigation such as scrolling down a long list of songs to choose a song), and game applications (e.g. steering a car in a first person driving game) increases, the keypad on electronic devices, such as a cellular phone, is increasingly becoming a bottleneck to speed, accuracy and ease of data entry, playing games, picking items from long lists, web browsing, and launching applications.

For example, many hand-held electronic devices, in particular cellular phones, typically use a D-pad as the primary way to navigate up and down a list of items, such as a list of songs, on an item-by-item basis. Such item-by-item scrolling, however, is typically inefficient in navigating from the first item in the list to the last item in the list, especially if the list includes hundreds of items. Although most of these electronic devices provide the user with page up and page down functionality, which permits the user the scroll a number of items at once, e.g., some applications may associate ten items per page, often times such page up and page down functionality must be executed through multiple taps or presses of one or more input elements, typically those making up the keypad. The particular number of taps or number of input elements required to evoke such page up and down functionality typically depends on the application developer's preference, and therefore often differ from application to application within the same electronic device. Even the same application may be implemented using different user interfaces in different hand-held electronic devices.

Various human interface and input systems and techniques for hand-held electronic devices have been developed for data input and device control. These include miniature keyboards and keypads used in combination with chordal input techniques, modal input techniques and/or smart keys; and touch screens used in combination with on-screen keyboard or keypad software or hand-writing recognition software. Additionally, for gaming, some hand-held electronic devices, such as cellular phones, have incorporated miniature thumb joysticks on the face of the device itself in lieu of the directional navigation pad (D-pad).

Keyboard or Key Pad Used with Chordal, Modal and Smart Key Techniques

Miniature keyboards and keypads are similar to their standard full-size versions—i.e., a keyboard generally has a full set or substantially full set of numeric, character, and functional input elements, while key pads typically have a reduced set of numeric, character and/or functional input elements compared to keyboards. These miniature input devices typically are designed to fit the available space on one surface of a hand-held electronic device or are designed as small, easily transportable, external plug-in devices. Thus, as hand-held electronic devices become smaller, the size of the input elements typically has been reduced in order for the desired number of input elements to fit on one surface of the electronic device.

For data input and device control, miniature keyboards and keypads typically either require one of two input techniques—use of one or more thumbs or fingers to press the desired input elements or use of a stylus to "peck" the desired input elements (which is usually done where the input element is of smaller size). Various techniques, such as chordal input techniques, modal input techniques and smart keys, have been developed and implemented to improve the efficiency and effectiveness of using miniature keyboards and keypads.

Chordal Input Techniques

Chordal input techniques generally are based upon the principle that characters, symbols, words, phrases or concepts can be represented by a reduced set of input elements. Thus, by only having to press a reduced combination of input elements, functionality can be increased and quicker and more accurate data input can be realized. Chordal input techniques can be used on any keyboard or keypad configuration or any device having more than one input element, and typically results in fewer input elements or more functions compared to conventional keyboards or keypads. An example of an electronic device using two-handed chordal input techniques is a court reporter or stenographer's typewriter. One chordal input technique using a keypad to decrease the number of actuations to achieve a large number of functions is described in U.S. Pat. No. 5,973,621 to Levy, entitled "Compact Keyed Input Device," which is incorporated herein by reference.

Modal Input Techniques

Modal input techniques are based on the concept that functions of the electronic device, e.g., text messaging in a cellphone or PDA, can be accessed by pressing a particular input element (or combination of elements) on a keyboard or keypad. Once that particular input element is pressed, the functionality of all or a portion of the input elements on the keyboard or keypad may change. Modal techniques typically are used in calculators, cellular phones, and PDAs. For example, in cellular phones, a modal technique called multi-tap is common, in which individual input elements on the keypad are associated with multiple symbols, such as characters, letters, numbers, icons or other types of symbols, which tends to reduce the number of input elements required to achieve the desired functions, e.g., a twelve-input-element keypad can be used to represent all letters of the English alphabet and the decimal digits. A user can input a desired symbol within a set of symbols associated with a certain input element by tapping on that particular input element with a thumb, finger, or stylus, one or more times to input the desired character. Thus, if a user desires to send a text message, the user may press a functional input element, e.g., a mode key, to access the text messaging functionality of the cellular phone and then tap an individual input element one or more times to select the associated symbol for input. The number of taps needed to input a particular symbol may differ depending on the language character set chosen. For example, Japanese keypad or keyboards typically require a minimum set of 46 characters for text input, while English or American keyboards and keypads usually require a minimum set of 26 characters for text input. These modal input techniques have gained some popularity as users perform more text functions, but these techniques can be cumbersome because to access some letters or characters, an input element on the keypad may have to be tapped three or four times. Also, in hand-held devices with a keypad, such as a cellular phone, these modal input techniques typically rely on the user's thumb, which is not generally as dexterous as the user's fingers.

Smart Keys

Smart keys are typically used on keypads and refer to a single key or combination of keys that, when pressed, predict the users next logical action. Some implementations work better than others and some applications reduce the number of keystrokes required to complete a function better than others. Word-predictor software, for example, attempts to predict the word or character the user intends to input based upon one or more letters inputted by the user and the likely probabilities within a given language. The probability of the software guessing correctly increases with the length of the word or number of letters or characters inputted. In a device using smart keys on the keypad, a user may tap the keys 2, 2 and 8 in sequence to generate the word "cat" and the device would display that word first because it is usually the most common combination, whereas the word "bat," which can be generated by pressing the same keys, would not be displayed first because it is not as common. Also, the word "cat" may be displayed after pressing the 2 key the second time based on a guess by the word-predictor software.

Smart keys also are typically used for Japanese data input where a user phonetically inputs letters representing the sound of the Japanese character (e.g., a Kanji character). Based on the inputted letters, the predictor software guesses the Japanese character. To select the character, a user would press the accept button or use the scrolling function to go to the next character with a similar set of phonetic inputs.

Touch Screen Using On-Screen Keyboard or Handwriting Recognition Software

Using on-screen keyboard or keypad software with a touch screen offers users the ability to enter data with fingers or thumbs on a screen-sized keyboard or buttons, allowing faster data input without a stylus or physical keyboard or keypad accessory; while using handwriting recognition software with a touch screen, such as Graffiti™ on the Palm operating system, offers users the ability to enter text with a stylus by writing the text directly on the touch screen. Touch screens usually consume more power and are more expensive than non touch-sensitive screens. This higher power consumption can be a problem for hand-held electronic devices, which typically have limited power resources. Moreover, touch screens usually require the user to use both hands (e.g., one hand is used to hold and steady the device while the other hand is used to grasp the stylus), which is generally undesirable for interfacing with and controlling one handed hand-held electronic device, such as cellular phones. Handwriting recognition software has improved the slowness and awkwardness inherent in stylus, finger or thumb input but other drawbacks still remain, such as high power consumption, the necessity to use both hands, and lack of tactile feedback to inform a user when an input element has been. Moreover, recognition software requires training to use properly, and, even then, still results in a high error rate.

Game Control

For game control, many of the above approaches have been used, but in most hand-held electronic devices, a user typically controls game play through the use of some form of input element, such as on a miniature keypad and/or D-pad, which typically is located on the front surface of the device. Game control on some hand-held electronic devices, such as cellular phones, is inherently one handed or at most two thumbed because of the size of the device, while game control on other hand-held electronic devices, such as PDAs and conventional game console controllers, is typically two-handed. The input elements associated with game control on these devices are typically digital, particularly the D-pad, even though analog input elements have been used on game controllers for PC and console game systems, such as Microsoft's Xbox or Sony's Play Station 2.

Child-Friendly Mobile Devices

Some of the mobile handset manufacturers have designed special mobile handsets designed for children. These handsets typically limit the number of available buttons. For example, in lieu of a full numeric keypad, navigation keys, and other user input elements, these handsets tend to have just a few buttons to execute certain functions. For example, the FireFly™ child phone has a "mommy" and "daddy" button, a phone book button that stores a few numbers, as well as keys for starting and ending a call. The LG Migo™ and the Wherifone™ phones have four or five programmable keys to allow the parent to program in a phone number for the child to use. The Tic Talk™ phone has no buttons on the face of the phone. The parent typically can set up a list of people or phones (with phone numbers attached) for the child to call, and the child simply scrolls through a list using two input elements on the side to select the person to call. These products tend to be designed with bright attractive colors that are appropriate for the age group they are being marketed to. The Tic Talk™ phone also is provided with preloaded games that the child can play.

Alternatively, a conventional mobile handset can be obtained from cellular operators that can be limited in functionality and usage. A parent can program a child's handset with a list of phone numbers to restrict the outbound calls from the child's handset to the phone numbers on the list. For example, the child may dial 911, and the numbers of their parents and grandparents, but they may not dial anyone else's number even if the child dialed the number manually on the keypad. The parent may also lock out access to the phone during certain periods of time in the day. For example, the parent can set up the phone such that the child may not dial or send text messages to any number except 911 during the time the child is supposed to be in school. Disney® Mobile is an example of a family oriented service that specifically caters to parents who wish to monitor or manage the mobile handset usage of their children.

There are also non-handset products that are designed for children. The ChatNow™ handset from Hasbro® is essentially a walkie talkie that provides voice communication and text messaging without the expense of a service plan. The ChatNow handset is designed to look and work like a mobile handset but uses radio communications with an operating range of a two mile radius.

SUMMARY

The present inventors recognized that conventional human interface and input systems for hand-held electronic devices tended to be relatively inflexible, cumbersome, and inefficient to use, among other reasons, because they were not designed to take advantage of the biomechanics of the human hand, particularly the advantages associated with the opposition of the thumb to the fingers and the beneficial attributes of the thumb, e.g., its large range of motion and ability to impart large sustained forces, and the beneficial attributes of the fingers, e.g., their fine motor control, spatial memory and rapidity of motion.

The present inventors also recognized that the input techniques developed to improve the efficiency of data input and device control, such as chordal and modal techniques, were limited by the inefficiencies inherent in conventional input systems. For example, miniature keyboards and keypads used in combination with chordal input techniques not only required the user to memorize numerous input combinations and develop the necessary motor skills to control a reduced number of input elements to provide even more complex functionality compared to typical QWERTY keyboards, but also did not use or allocate input tasks to the fingers and thumb of the human hand effectively. Moreover, miniature keyboards and keypads used in combination with modal input techniques tended to limit the user's ability to efficiently input data depending on the number of taps required to input a particular symbol and how fast the user could tap the input element with his thumb or a stylus to select the particular symbol.

The present inventors also recognized that, with the emergence of multimedia capabilities, such as MP3, in many hand-held electronic devices, there is a need to support fast and intuitive scrolling and list navigation actions. For example, many hand-held electronic devices, in particular cellular phones, typically use a D-pad as the primary way to navigate up and down a list of items, such as a list of songs, on an item-by-item basis. Such item-by-item scrolling, however, is typically inefficient in navigating from the first item in the list to the last item in the list, especially if the list includes hundreds of items. Moreover, the page up and page down functionality provided on many of these devices to make it easier for a user to navigate long lists of items often must be executed through multiple taps or presses of one or more input elements. The particular number of taps or number of input elements required to evoke such page up and down functionality usually depends on the application developer's preference, and therefore often differs from application to application within the same electronic device.

The present inventors also recognized that a user's ability to control game play in such devices was greatly limited. For example, while analog game control has been available to users of PC and console game systems, analog game control generally has not been widely available on hand-held electronic devices, such as cellular phones and PDAs. As noted above, most high end games that run on a gaming platform such as the Xbox or the Play Station 2 involve analog or continuous inputs from one or more input elements, such as a miniature or full sized joystick. Cellular phones and PDAs, in contrast, provide only buttons or keys as input elements for game play. Moreover, to the present inventors knowledge, there are no standards for input element layout for cellular phones, or in the way that the input elements are mapped to gaming functions. For example, often times, the D-pad provided on most of these cellular phones is not available to the game developer to use as a game input. The result is that directional movement input is often provided using the number input elements on the keypad, particularly the "2", "8", "4", and "6" input elements on the keypad for up, down, left and right directional movement. The present inventors recognized that this layout presents several problems. First, the input is discrete, so there is no way to provide a continuous input, such as steering a car in a first person driving game. In such as game, the car can be steered to move only left, straight, or right in preset increments, which severely limits the quality of the gaming experience. Second, directional movement is provided by the number input elements while the clearly labeled arrow keys on the D-pad remain unused. This typically requires getting used to and may create user confusion. Third, the number input elements are typically located on one end of the phone's surface, and are thus less comfortable to use than the D-pad which is typically located above the number input elements. The result is that game play is limited and not as widely adopted as it might be with a better interface.

The present inventors have further recognize that conventional mobile handsets are often too complex to be practical for a young child's use, and the expense of the service plan associated with the mobile handsets can often be prohibitive. The special mobile handsets, while easier for a young child's use, are typically expensive and can be prone to being outgrown by the child as he grows older.

Consequently, the present inventors have developed a flexible and efficient human interface and input system and techniques that may be implemented on a variety of small hand-held accessory devices or "input accelerator" devices, such as a key fob or remote control. An input accelerator device or an accessory device may connect to one or more conventional hand-held electronic devices (i.e., a host electronic device), such as a cellular phone, PDA, pocket PC, smart phone, MP3 player, or other similar devices using a wired or wireless communication protocol, such as Bluetooth, and remotely control all functions of the connected host electronic devices. The accessory device may be used in conjunction with the input elements on the host electronic device to accelerate the user's ability to perform functions such as text input, game play, list navigation and scrolling. Alternatively, the accessory device can even eliminate the need to directly interface with the inefficient human interface and input systems of the connected host electronic devices. The accessory device may also be implemented to include various hybrid devices including a wireless headset in addition to the functions of a remote control. The accessory device (whether one handed or two handed) may also be implemented to utilize the opposed thumb and finger ergonomics inherent in the hand and the skills already developed for using conventional input techniques to accomplish data input, list navigation, device control, and game control in a timely, efficient, comfortable, fun, and intuitive manner. Thus, no specialized training beyond that normally expected with any newly purchased hand-held device is expected. Further, the accessory device can be provided with a specially designed user interface that is appropriate for a young child's use. This child friendly accessory device can be implemented to customize and control a conventional mobile handset for young children. Any regular mobile handset may thus be converted to a child-friendly communication device that allows a child to stay in touch with his or her caregivers, or an elderly person to stay in touch with their families at all times. The device can work with many pre-existing mobile handsets, making the cost of ownership far lower than any existing products with cellular network coverage. This invention promotes personal security and peace of mind to members of society who are vulnerable to unsafe situations.

Implementations of the human interface and input system and techniques for the accessory device described here may include various combinations of the following features.

In one aspect, an accessory device for interfacing with a mobile host device includes a communication channel designed to establish a bi-directional communication link between the accessory device and the host device. The accessory device also includes a processor communicatively coupled to the communication channel. The processor is designed to execute a plurality of applications. In addition, the accessory device includes an input assembly communicatively coupled to the processor. The input assembly is designed to minimize a total number of input elements included in the input assembly. Further, at least a first input element being selectively mapped to one or more input functions of the host device based on a user selection.

In another aspect, an accessory device is designed by providing a communication channel used to transmit data bi-directionally between a host device and the accessory device. Also, a storage unit is be provided to communicatively couple to the communication channel. The storage unit is designed to store one or more data. Further, on one or more surfaces, an input assembly is disposed. The input assembly includes various input elements designed to receive human input through manipulation of the input elements. At least one of the input elements is further designed to be selectively mapped to one or more functions of the host device. In addition, an accessory processor is provided to communicatively couple to the storage unit, the communication channel, and the input assembly. The accessory processor is designed to execute the one or more data.

In yet another aspect, various host devices can be controlled by providing an accessory device. The accessory device includes a communication channel designed to transmit data bidirectionally between the plurality of host devices and the accessory device. The accessory device also includes a storage unit communicatively coupled to the communication channel. The storage unit is designed to store various data. The accessory device further includes an input assembly including various input elements. At least a first input element is designed to be selectively mapped to one or more input functions of the host device. The accessory device also includes a processor communicatively coupled to the communication channel and the input assembly, wherein the processor is operable to process one or more data. Further, various host devices can be controlled by actuating at least the first input element to control at least a first selectively mapped function of the host device using the communication channel.

Implementations can optionally include one or more of the following features. The accessory device can also include an output unit communicatively coupled to the processor. The output unit is designed to output an output data based on a user activation of at least the first input element. The output unit can include a speakerphone. Further, the accessory device can include a storage unit communicatively coupled to the communication channel, with the storage unit designed to store various data. In some instances, the storage unit includes a removable memory unit including a SD memory card, a mini-SD memory card, a micro-SD memory card, and a compact flash card. Also, the communication channel can be designed to transmit both data and voice communication. In addition, the communication channel can be designed to interface with one or more additional accessory devices. Also, the communication channel can further include a wireless data connection including at least one of a Bluetooth connection, an Infrared connection, a Wi-Fi connection, and a WiMAX connection. Also, the accessory device of claim can include a global positioning system (GPS) unit communicatively coupled to the processor. The GPS unit is designed to transmit positioning data of the accessory device to the host device. The input assembly can be further designed to optimize a biomechanical effect of the human user's opposing thumb and fingers.

The input accelerator device and human interface and input systems and techniques described herein may provide one or more of the following advantages. The human interface and input system and associated techniques offer the functionality of a high performance game controller, which can support the most demanding game input requirements, and the speed and accuracy of data input that can be obtained with the use of a conventional standard QWERTY keyboard, but without the large footprint. Also, the human interface and input system and associated techniques can increase the number of functions that may be associated with a given number of input elements without increasing the number of keystrokes or taps that is required. Moreover, it allows the input element size to remain consistent with the ergonomics of the human hand without increasing the time it takes to learn how to use the input system compared to conventional input systems.

Implementing the human interface and input system and techniques on an input accelerator device can eliminate the need to interface with inflexible, cumbersome, and inefficient input systems provided with conventional hand-held electronic devices. Since the input accelerator device can connect to multiple hand-held electronic devices using wired or wireless communication protocols a singled input accelerator device can make up for deficiencies of multiple conventional hand-held electronic devices. Thus, the input accelerator device can eliminate the need to retrofit or redesign conventional hand-held electronic devices to directly implement the disclosed human interface and input system and associated techniques. In addition, the input accelerator device can be small and aesthetically valuable as a fashion accessory. For example, the input accelerator device may be implemented to include logos of sports teams or cartoon characters in addition to a wide selection of colors. The input accelerator device also may be easily attached to a keychain or a phone leash or clipped on or carried in a pocket or purse.

In addition, an accessory device for customizing a host mobile device as described herein can provide a fresh user interface (UI) and features for the host mobile device and bypass the inherent UI and functionality of the host mobile device. The accessory device also provides a small, hand-held, and low-cost mobile device for customizing the UI of a preexisting conventional mobile device without having to modify or replace the conventional mobile device. The customizable accessory device can be designed to provide a user interface and a set of functionality appropriate for a target demographic (e.g., young children). The accessory device provides a simpler UI for a child's use, and the parent can pair the accessory device with a conventional mobile handset. Thereafter, the functionality on the mobile handset can be easily controlled by the child interfacing with the accessory device. The accessory device can also include walkie-talkie functionalities to allow a parent to communicate with a child equipped with the accessory device without incurring air time fees. Further, the accessory device can include a global positioning system (GPS) unit to assist the parent track the location of the child. In addition to helping children stay in touch with their parents and get emergency help when needed, this invention can also be applied to provide an easy-to-use mobile interface for other demographics, such as elderly persons or persons with conditions resulting in special cognitive and user interface needs.

Details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Biomechanics of the Human Hand

The human hand comprises an opposable thumb and four fingers, i.e., the thumb may be used in opposition, in concert, in combination or functional relation with any of the four fingers. Compared to the human fingers, the human thumb may be characterized as having larger range of motion, stronger sustaining force actuation and poorer dexterity. The human base joint of the thumb has three degrees of freedom, such as side-to-side movement, up and down movement, and rotation about the thumb's long axis; while the base joint of the fingers has two degrees of freedom, such as side-to-side and up and down movement. Thus, the thumb typically is considered to have better range of motion than any of the fingers. Also, because the human thumb has a bigger actuation muscle than any of the fingers, it can provide larger sustaining forces than the fingers. But also because of the larger muscle, the human thumb may suffer from diminished fine motor control and rapidity of motion that can be exerted compared to the fingers. Thus, the human fingers are more suitable for performing tasks that require fine motor coordination or the ability to pinpoint or rapidly repeat actuation.

Hand-Held Input Accelerator Device Hardware Overview

Figure 1:
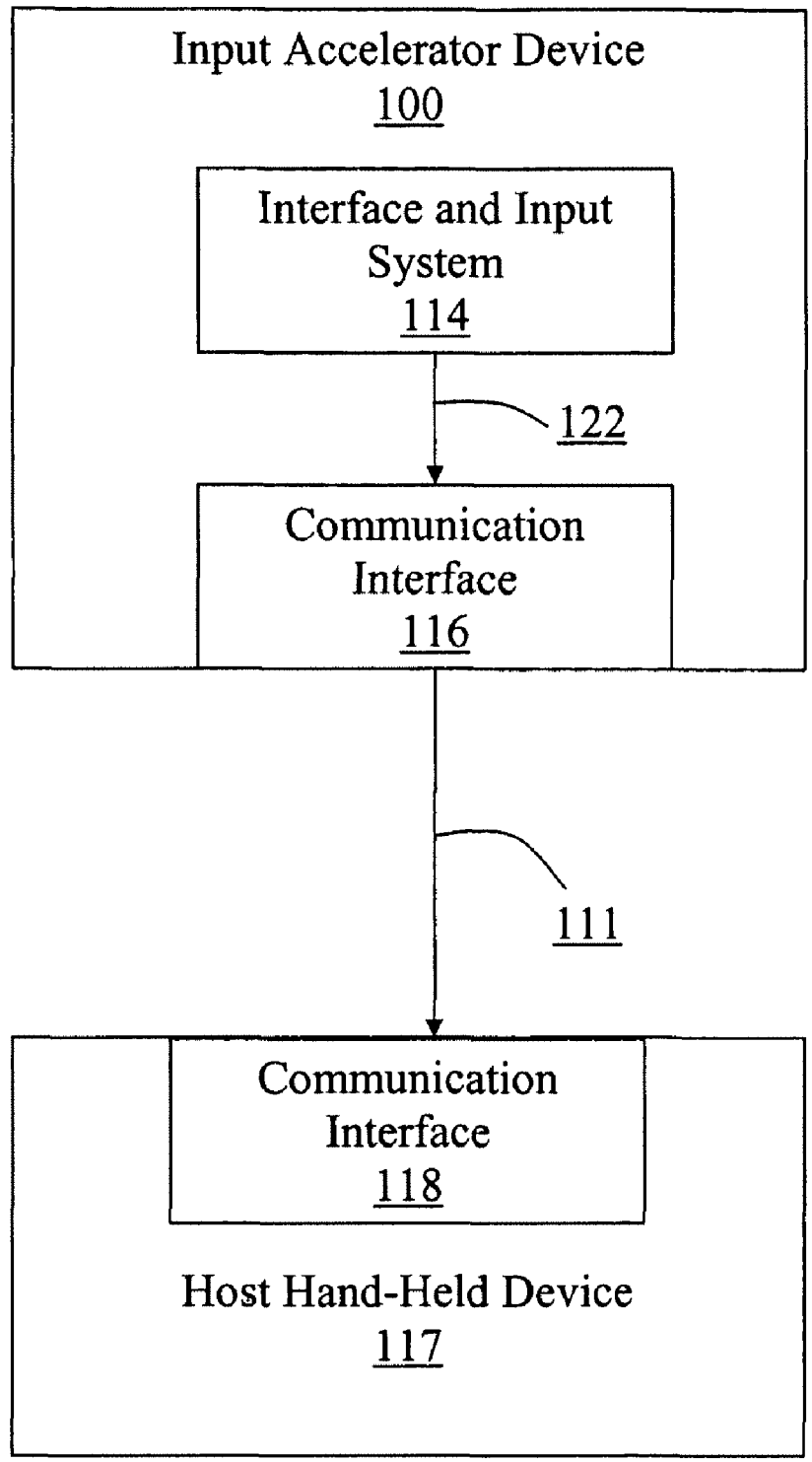
FIG. 1 is a block diagram of a hand-held input accelerator device upon which the human interface and input system may be implemented.

FIG. 1 is a high-level block diagram of a hand-held input accelerator device 100 upon which the human interface and input system and associated input techniques described herein may be implemented for controlling software applications stored and running on a hand-held host device 117. The input accelerator device 100 is a companion auxiliary device to the hand-held host device 117, whereby a user may interface with the auxiliary device and the hand-held host device concurrently 117 or the auxiliary device alone in lieu of the hand-held host device 117. The input accelerator device 100 is communicatively coupled to a hand-held host device 117, such as a cellular phone, PDA, pocket PC, or smart phone, or other similar devices using a communication link 111, such as the Bluetooth protocol. The Bluetooth protocol is a short-range, low-power 1 Mbit/sec wireless network technology operated in the 2.4 GHz band, which is appropriate for use in piconets. A piconet can have a master and up to seven slaves. The master transmits in even time slots, while slaves transmits in odd time slots. The devices in a piconet share a common communication data channel with total capacity of 1 Mbit/sec. Headers and handshaking information are used by Bluetooth devices to strike up a conversation and find each other to connect.

The communication link 111 alternatively may be a wired link using standard data ports such as Universal Serial Bus interface, IEEE 1394 firewire, or other serial or parallel port connections. Additionally, the communication link 111 can be other standard wireless links such as infrared, wireless fidelity (Wi-Fi), or any other wireless connection. Wi-Fi refers to any type of IEEE 802.11 protocol including 802.11a/b/g. Wi-Fi generally provides wireless connectivity for a device to the Internet or connectivity between devices. Wi-Fi operates in the unlicensed 2.4 GHz radio bands, with an 11 Mbit/sec (802.11b) or 54 Mbit/sec (802.11a) data rate or with products that contain both bands. Infrared refers to light waves of a lower frequency out of range of what a human eye can perceive. Used in most television remote control systems, information is carried between devices via beams of infrared light. The standard infrared system is called infrared data association (IrDA) and is used to connect some computers with peripheral devices in digital mode.

The communication link 111 connects a communication interface 116 of the input accelerator device with a communication interface 118 of the hand-held host device 117. The input accelerator device 100 includes an interface and input system 114 in communication with the communication interface 116. The interface and input system 114 includes input elements (not shown), such as keys, buttons, pressure sensor pads, touch pads, rotary dials, thumb joysticks, linear strip sensors or other actuators associated with one or more sensors that can be manipulated by one or both of a human user's thumbs or fingers. The input elements are selectively mapped to one or more functions of the software applications stored on the host device 100. The mapping or re-mapping of the input elements to one or more functions of the software applications may be accomplished by using one of the techniques disclosed in co-pending U.S. patent application Ser. No. 11/221,412, entitled "A Method of Remapping the Input Elements of a Hand-Held Device," which is incorporated herein in its entirety by reference.

In this implementation, the interface and input assembly 114 is implemented with four input elements, but may be implemented with more or fewer input elements. Upon actuation of an input element, an electrical signal is generated by the input assembly 114. The generated electrical signal is converted into input signals 122, which are transmitted over the communication link 111 to the hand-held host device 117, which receives the input signals 122 through communication interface 118. The input signals 122 are processed by the hand-held host device 117 to execute the software function mapped to the actuated input element. Typically, hand-held host device 117 has a processor (not shown), such as an ARM, OMAP, or other similar processor for processing the input signals and the software applications stored and running thereon.

Figure 2:
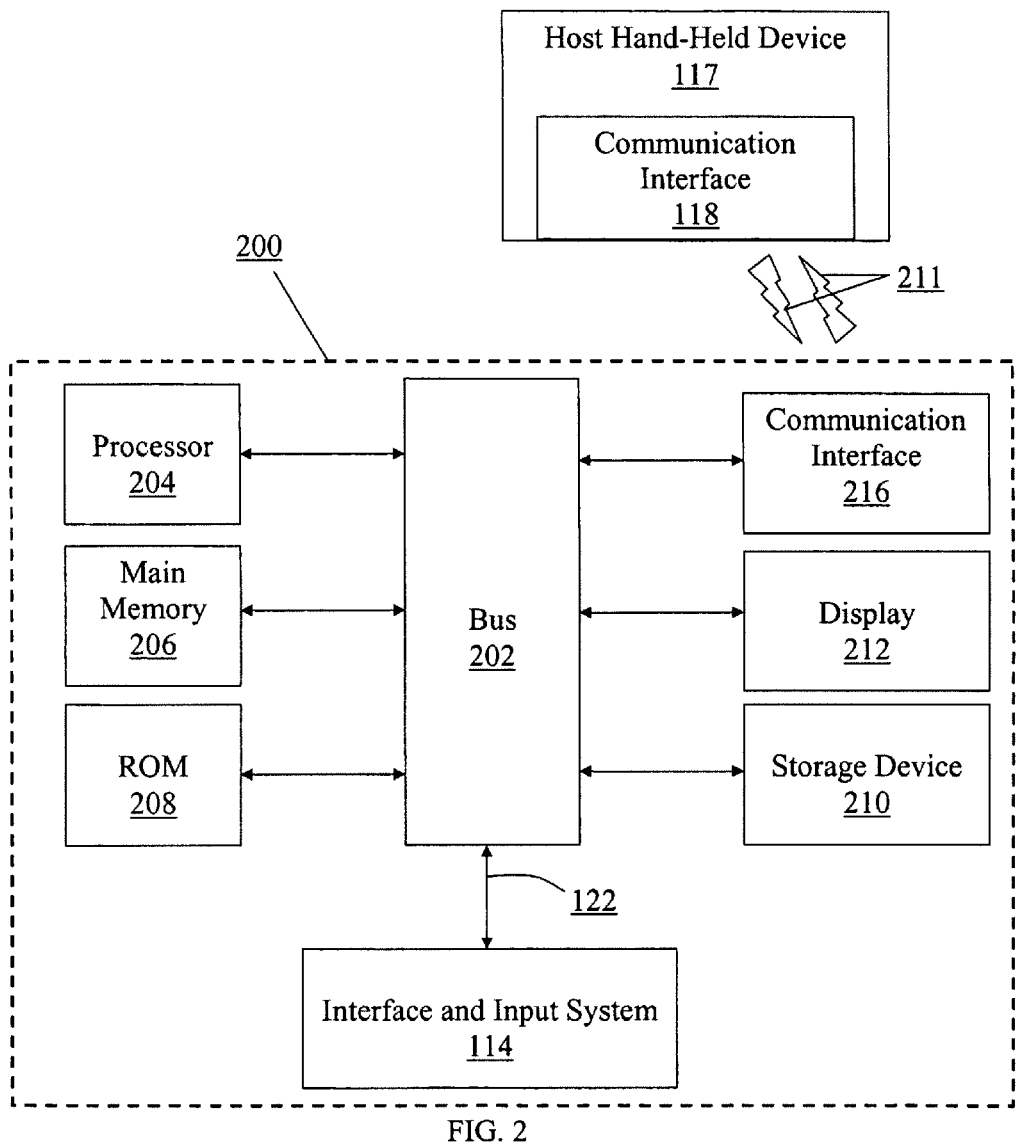
FIG. 2 is another block diagram of a hand-held input accelerator device upon which the human interface and input system may be implemented.

FIG. 2 is a block diagram illustrating an input accelerator device 200 upon which the human interface and input system and associated input techniques described herein may be implemented. In this implementation, optional hardware components are implemented to configure a more powerful auxiliary device to handle more of the processing duties from the hand-held host device 117 onto the input accelerator device 200. The input accelerator device 200 may be used in conjunction with the hand-held host device 117 to control software applications stored and running on the input accelerator device 200 itself. For example, in this implementation, the input accelerator device 200 may have stored and running thereon re-mapping software such as that described in co-pending U.S. patent application Ser. No. 11/221,412. As another example, the input accelerator device 200 may have stored and running thereon an Internet browsing application, which may be used in combination with communication functionality provided with hand-held host devices, such as the cellular communication protocols (e.g., CDMA or GSM/GPRS) provided with cellular phones, to browse the Internet.

The input accelerator device 200 is in wireless (or alternatively wired) communication with the hand-held host device 117. The hand-held host device 117 may include some of the same components as shown for the input accelerator device 200. In this implementation, the hand-held host device 117 is a conventional cellular phone, but other types of hand-held electronic devices may be used with the input accelerator device 200. The input accelerator device 200 may include a bus 202 or other communication mechanism for communicating information, and a processor 204, such as an ARM, OMAP or other similar processor, coupled with bus 202 for processing information, such as one or more sequences of one or more instructions, which may be embedded software, firmware, or software applications for controlling the hand-held host device 117, such as re-mapping software or text, gaming or scrolling applications, or any other software application.

The input accelerator device 200 also may include a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. The input accelerator device 100 further may include a read only memory (ROM) 208 or other static storage device coupled to bus 202 for storing static information and instructions for processor 204. A storage device 210 may be provided and coupled to bus 202 for storing information and instructions for the processor 204. The storage device 210 can include a flash memory such as EEPROM, compact flash, or a similar storage unit for storing device firmware. Upgrades to the firmware can be easily downloaded through the host device. The input accelerator device 200 may also include an optional display 212, such as a liquid crystal display (LCD), for displaying information to a user, and a human interface and input system 114 for communicating information and command selections from a human user to processor 204. The command selections from a human user are communicated as input signals 122 from the interface and input system 114 to the bus 202 for distribution to other components such as the processor 204. Input accelerator device 200 also may include a communication interface 216 coupled to bus 202.

Communication interface 216 provides a two-way data communication 211 coupling to the hand-held host device 117, a wireless service device, or wireless service station. The two-way data communication 211 allows for an exchange of interactive data between the hand-held host device 117 and the input accelerator device 200. The interactive data may include voice data for conducting a conversation using a cellular phone host device. The interactive data may also include a graphical user interface (GUI) for browsing the Internet, which may be displayed on the optional display 212. In this implementation, the cellular phones host device serves as a communication conduit for receiving data from the Internet as previously mentioned. Communication interface 216 may be a wireless link such as Bluetooth or any other wireless communication interface known to one of ordinary skill in the art. In the wireless link implementation, communication interface 216 may send and receive electrical, electromagnetic or optical signals that carry digital data streams representing various types of information.

The input accelerator device 200 also can display a graphical user interface (GUI) on the display unit 212 to provide a list of hand-held host devices 117 within communication range of the input accelerator device 200. The list of hand-held host devices 117 within communication range can be displayed using text names of each device, an icon representing each device, or a combination of text name and icon representing each device. The input elements in the input assemblies 406, 408, 409 (described in detail in FIG. 4 below) can be actuated in combination or individually to select a desired hand-held host device 117 from the list of devices in communication range of the input accelerator device 200.

The input accelerator device 100, 200 as described above can obviate the need to remove the hand-held host device 117 from the user's pocket, bag or other storage location by performing most simple text/voice control functions. The input accelerator device 100, 200 may also include a device driver (not shown) to effect control over the host hand-held device 117 and all associated software applications on the hand-held host device 117.

Human Interface and Input System Overview

Figure 3:
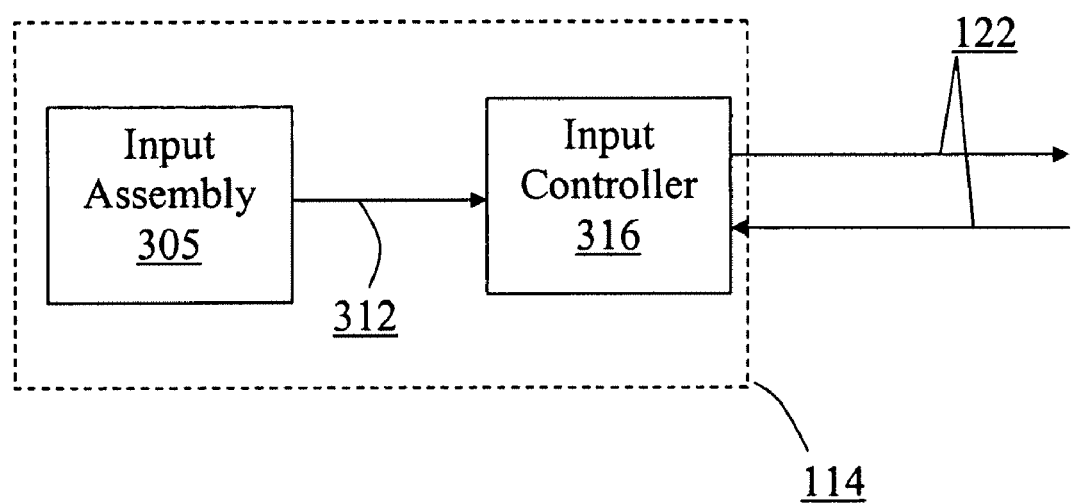
FIG. 3 is a block diagram of the human interface and input system.

FIG. 3 depicts a block diagram of the subsystems of the human interface and input system 114 of the input accelerator device 100 or the input accelerator device 200. The human interface and input system 114, which is described in more detail in co-pending U.S. patent application Ser. No. 10/699,555, entitled "Human Interface System," which is incorporated herein in its entirety by reference, includes an input assembly 305 in communication with an input controller 316 to interpret and generate input signals in response to user interaction with the input assembly 305. The input assembly 305 can include multiple input assemblies (described in detailed below in FIG. 4), each assembly including a number of input elements, located on one or more surfaces of the input accelerator device 100 or the input accelerator device 200. The input elements are selectively mapped to one or more functions of a software application that is stored on the hand-held host device 117 so that when one of the input elements is actuated, the function mapped to the actuated input element is executed.

Specifically, when an input element is actuated, one or more electrical signals 312 are produced, which are received and interpreted by the input controller 316. The input controller 316, which may include one or more processors, receives the one or more electrical signals 312 and converts them into input signals 122 which are transmitted to the hand-held host device 117 via communication link 111 connecting the communication interface 116 of the input accelerator device 100 with the communication interface 118 of the hand-held host device 117. Similarly, the input signals 122 are transmitted to the hand-held host device 117 via communication link 211 connecting the communication interface 216 of the input accelerator device 200 with the communication interface 118 of the hand-held host device 117. In one implementation the hand-held host device 117 interprets the input signals 122 on the fly using software, such as mapping software, to execute the function mapped to the actuated input element. Alternatively, the input accelerator device 200 may interpret the input signals 122 using software stored in the storage unit 210.

Figure 4:
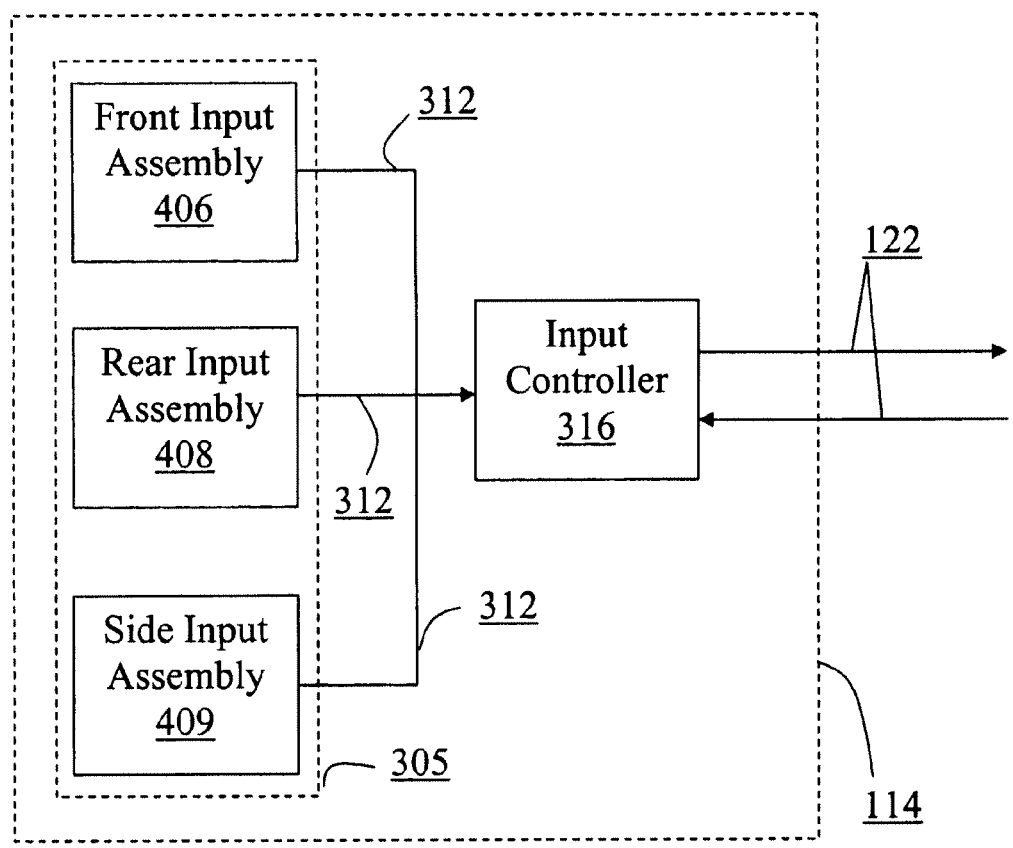
FIG. 4 is a detailed block diagram of the input assembly of the human interface and input system.

FIG. 4 illustrates one implementation of input assembly 305 including multiple input assemblies. The input assembly 305 includes a front input assembly 406, a rear input assembly 408, and a side input assembly 409. The front input assembly 406 and the rear input assembly 408 includes one or more input elements. The input elements produce one or more electrical signals 312 upon actuation of the input elements. The input controller 316, which may include one or more processors, receives the one or more electrical signals 312 and converts them into input signals 122, which are in a form suitable to be received and interpreted by the hand-held host device 117. Alternatively the input signal 122 may be interpreted by the processor 104 on the input accelerator device 200.

The hand-held host device 117 receives the input signals 122 and interprets it using the re-mapping software noted above and described in more detail below, which may be loaded on the host hand-held device. Specifically, the input signals 122 transmitted from the input accelerator device 100, 200 are received by a communication interface 118 on the hand-held host device 117 using standard communications protocols, such as the Bluetooth wireless protocol. The Bluetooth protocol allows the input signals 122 transmitted from the input accelerator device 100, 200 to control execution of embedded software, firmware, or software applications, such as a text messaging or game applications, on the hand-held host device 117. The input signals 122 are received and used by the hand-held host device 117 to map and remap the input elements in the front input assembly 406, the rear input assembly 408 and the side input assembly 409 to one or more software functions of a software application running on the host hand-held device 117.

For example, if a text application is running on the hand-held host device 117, then an input controller (not shown) on the hand-held host device 117 maps one or more input elements on the hand-held host device 117 (e.g., input elements forming the keypad on a cellular phone) to one or more symbols, such as characters, letters, numbers, icons, other types of symbols, or combinations of different types of symbols, and map one or more input elements of the front input assembly 406 on the input accelerator device 100, 200 to a shifting or indexing functionality. Thus, if a user wants to insert the letter "X", the user may press a first shift key on the input accelerator device 100, 200 and then the number key "9" on the hand-held host device 117. If the user wants to insert the letter "Y", the user may press a second shift key on the input accelerator device 100, 200 and then the number key "9" on the hand-held host device 117. If the user wants to insert the letter "Z", the user may press a third shift key on the input accelerator device 100, 200 and then the number key "9" on the hand-held host device 117 So instead of having to press the number key "9" on the hand-held host device 117 three times to insert the letter "Z", which is the norm on most multi-tap interfaces, the user can insert the same letter with one press of the number key "9" on the hand-held host device 117 in combination with one press of the third shift key on the input accelerator device 100, 200.

Also, one or more input elements of the rear input assembly 408 on the input accelerator device 100, 200 can be mapped to scrolling, navigation, or cursor control functions. Furthermore, one or more input elements of the side input assembly 409 can be mapped as a short-cut key for executing a favorite application on the host hand-held device 117, such as a text, game or music application. If the hand-held host device 117 is executing a game application, then the input signals 122 may be used to control game play. That is, the input controller (not shown) on the hand-held host device 117 may map the input elements of the input assemblies 406, 408, 409 from the input accelerator device 100, 200 to game functions. The mapping of the input elements to particular input functions for a given software application, whether done by an input controller or processor on the hand-held host device 117 in response to the input signals 122 transmitted by the input accelerator device 100, 200, may be customized by the application developer or the user through downloads or other programming modalities. Moreover, the mapping of the input elements may be done for language key set changes, which may reduce the cost of manufacturing hand-held electronic devices for manufacturers servicing multiple countries.

Alternatively, the processor 204 of the input accelerator device 200 may perform the mapping function described above and alleviate some of the processing burden of the hand-held host device 117. Moreover, the human interface and input system 114 need not have the input controller 316, particularly where cost is a concern. In those instances, the processor 204 can directly receive the electrical signal 312 and interpret it into a suitable input signal 122, which is mapped using the mapping techniques noted above and described in more detail below.

The co-pending U.S. patent application Ser. No. 11/221, 412, describes techniques to selectively map and re-map the input elements on a hand-held electronic device optimally for a particular class of application software with common requirements (e.g., games, text entry, music and scrolling) and/or for a particular user. These techniques may also be used to map and remap the input elements of the input accelerator device 100, 200 disclosed herein and/or the hand-held host device 117. Alternatively, the input accelerator device 100, 200 may simply transmit the input signals 122 in response to user manipulation of the input elements to the hand-held host device 117, where an application software executing on the hand-held host device 117 interprets the input signals accordingly.

In one implementation, a technique for remapping a hand-held electronic device includes receiving configuration settings, which may include at least one physical input element associated with at least one function, for a software application or a class of software applications; modifying a mapping function based on the configuration settings; and executing the function associated with the physical input element upon an activation, e.g., a press or actuation, of the physical input element during operation of the software application. The activation of the physical input elements may be from the three input assemblies 406, 408, 409 of the input accelerator device and/or the input assemblies of the host hand-held devices. As described above, using standard wireless communication protocols, such as Bluetooth, signals generated from the physical activations of the input assemblies of the input accelerator device 100,200 is transmitted to the hand-held host device 117 to control execution of specific software or software application. And in response to the execution of the software or software application by the signal transmitted from the input accelerator device, mapping and remapping procedures are performed. The mapping function may comprise a keyboard device driver, a device layout or a translation layer of the keyboard device driver, a combination of these or another mapping function.

In an implementation where the mapping function comprises a device layout, the step of executing the function associated with the physical input element upon an activation of the physical input element may include writing a scan code to a buffer; retrieving the scan code from the buffer; converting the retrieved scan code to a virtual input element code using the modified device layout; calling a keyboard event with the scan code and the virtual input element code; and executing the function associated with the keyboard event, which is the function associated with the physical input element.

In an implementation where the mapping function comprises a translation layer, the step of executing the function associated with the physical input element upon an activation of the physical input element may include writing a scan code to a buffer; retrieving the scan code from the buffer; converting the scan code to an original virtual input element code; converting the original virtual input element code to a new input element code using the modified translation layer of the keyboard device driver; calling a keyboard event with the scan code and the new virtual input element code; and executing the function associated with the keyboard event, which is the function associated with the physical input element.

In another implementation, a method of re-configuring or re-mapping a software application or class of software applications may include associating one or more physical input elements disposed on the input accelerator device with at least a first executable function; and causing a modification of a mapping function to form an association of the one or more physical input elements with a second executable function to an association of the one or more physical input elements with the first executable function so that the first executable function is configured to be initiated upon an activation of the one or more physical input elements during operation of the software application or the a software application within a class of software applications. The second executable function is typically a default function typically provided with the software application to be executed in the default state when the one or more physical input elements are pressed or activated.

In yet another implementation, a graphical user interface identifying functions that are available to be associated with one or more physical input elements may be provided. The graphical user interface may also identify software applications for which a user can select to apply his physical input element to function associations. In one instance the graphical user interface may include input element icons, which correspond to physical input elements, and function icons, which correspond to an executable function. The user may then specify the functions to associate with physical input elements.

Hand-Held Input Accelerator Device Implementations

FIGS. 5*a*-*d* illustrates front, side, back, and "hand-held" views, respectively, of a hand-held input accelerator device 500 upon which the human interface and input system may be implemented. In one implementation, the input accelerator device 500 is implemented as a remote control device including four planar or contoured surfaces: a front surface 502, a back surface 508, a left side surface 504, and a right side surface 306. Although, in other implementations, the input accelerator device 500 may have more or fewer planar and/or contoured surfaces. The input accelerator device 500 may be a miniature standalone wireless accessory device that communicates with a variety of hand-held devices such as a cellular phone, PDA, pocket PC, smart phone, laptop, or other similar devices through a wired or wireless communications protocol, such as the Bluetooth wireless protocol.

Figure 5A:
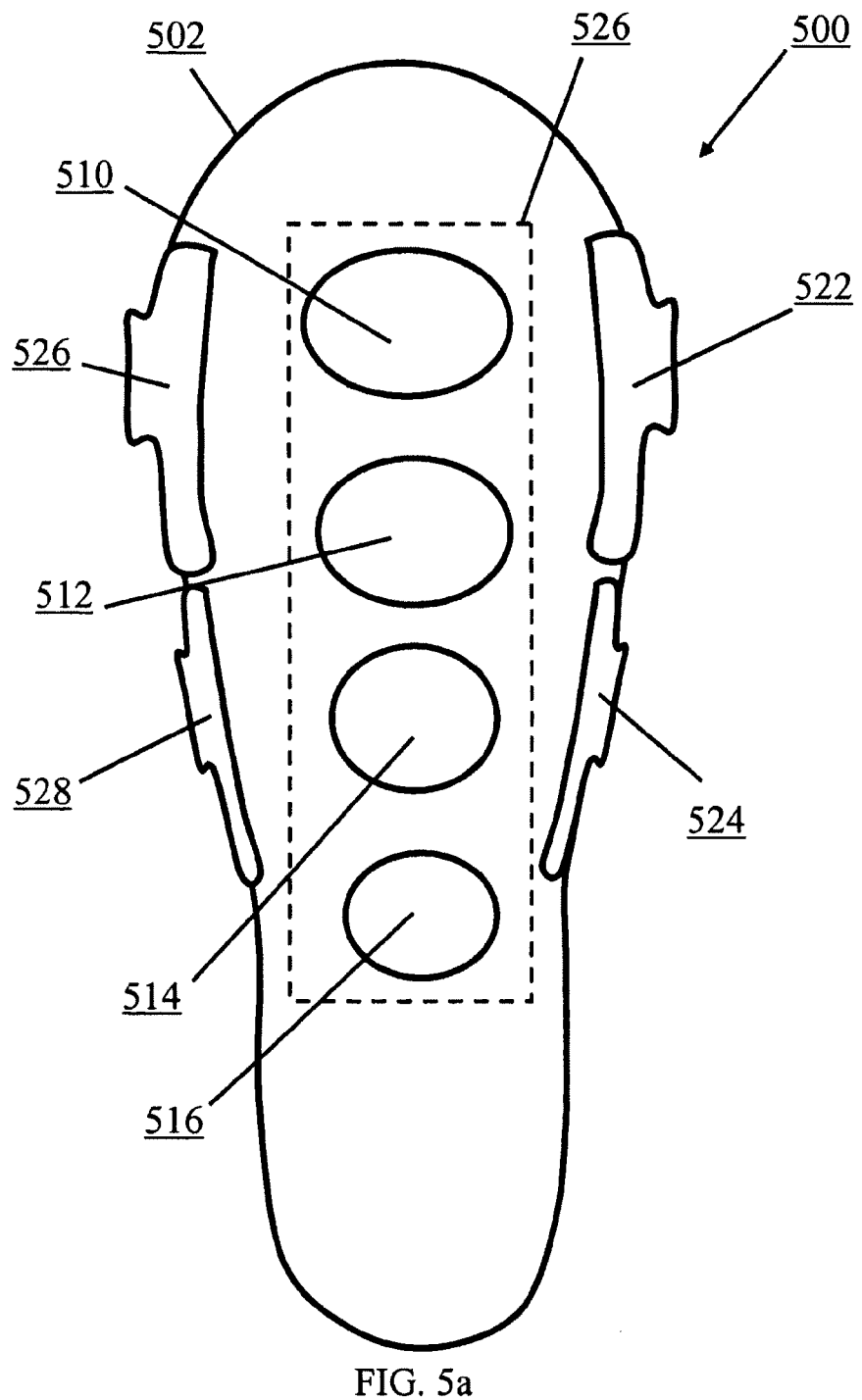
FIGS. 5a-d show front, side, and back views, respectively, of a hand-held input accelerator device wherein a second input assembly includes a pressure sensor arrays having a plurality of configurable active areas.

As shown in FIG. 5*a*, on the front surface 502, a display (not shown), such as an LCD, and a front input assembly 526 may be disposed adjacent to each other. Alternatively, the display may be on a separate assembly such as those displays for PDA's and cellular phones with a swivel-mounted screen or flip-phone configurations. Also, the front input assembly 526 may be disposed on more than one surface. The front input assembly 526 may include four input elements 510, 512, 514, and 516, although any number of input elements may be provided, which may be actuated by a user's thumb or fingers. The input elements 510, 512, 514, and 516 may be mapped to function as shift or index keys, such as Shift1 (510), Shift2 (512), Shift3 (514), and Shift4 (516), to facilitate shifting or indexing between symbols, such as characters, letters and/or numbers, associated with input elements on the host electronic device, such as a keypad on a cellular phone or PDA. For example, on a host electronic device, such as a cellular phone, typically a keypad is provided, which has a "7PQRS" key or input element. By using the input accelerator device 500, any one of these symbols—P, Q, R, and S—may be entered by tapping the appropriate input element 510, 512, 514, and 516 and tapping the "7PQRS" key on the host electronic device. That is, the "P" character, e.g., can be entered on the host electronic device by pressing input element 510 (which is mapped as Shift1) and pressing the "7PQRS" key on the host electronic device. Likewise, the Shift2 input element 512 may be pressed with the "7PQRS" key to produce the "Q" character. The Shift3 input element 514 may be pressed with the "7PQRS" key to produce the "R" character. Pressing the "7" key without shift keys can either produce the number "7" or the "P" character depending on user preference, which can be configured in software. The Shift4 input element 516 can be pressed with the "7PQRS" key to produce the "S" character. Thus, the need to tap the same key on the host device multiple times (i.e., three times) to enter, for example the "S" character" is eliminated. The implementation of multiple shift or indexing input elements as described above can dramatically improve the comfort, accuracy and speed of text entry for a variety of host hand-held device users.

Figure 5B:
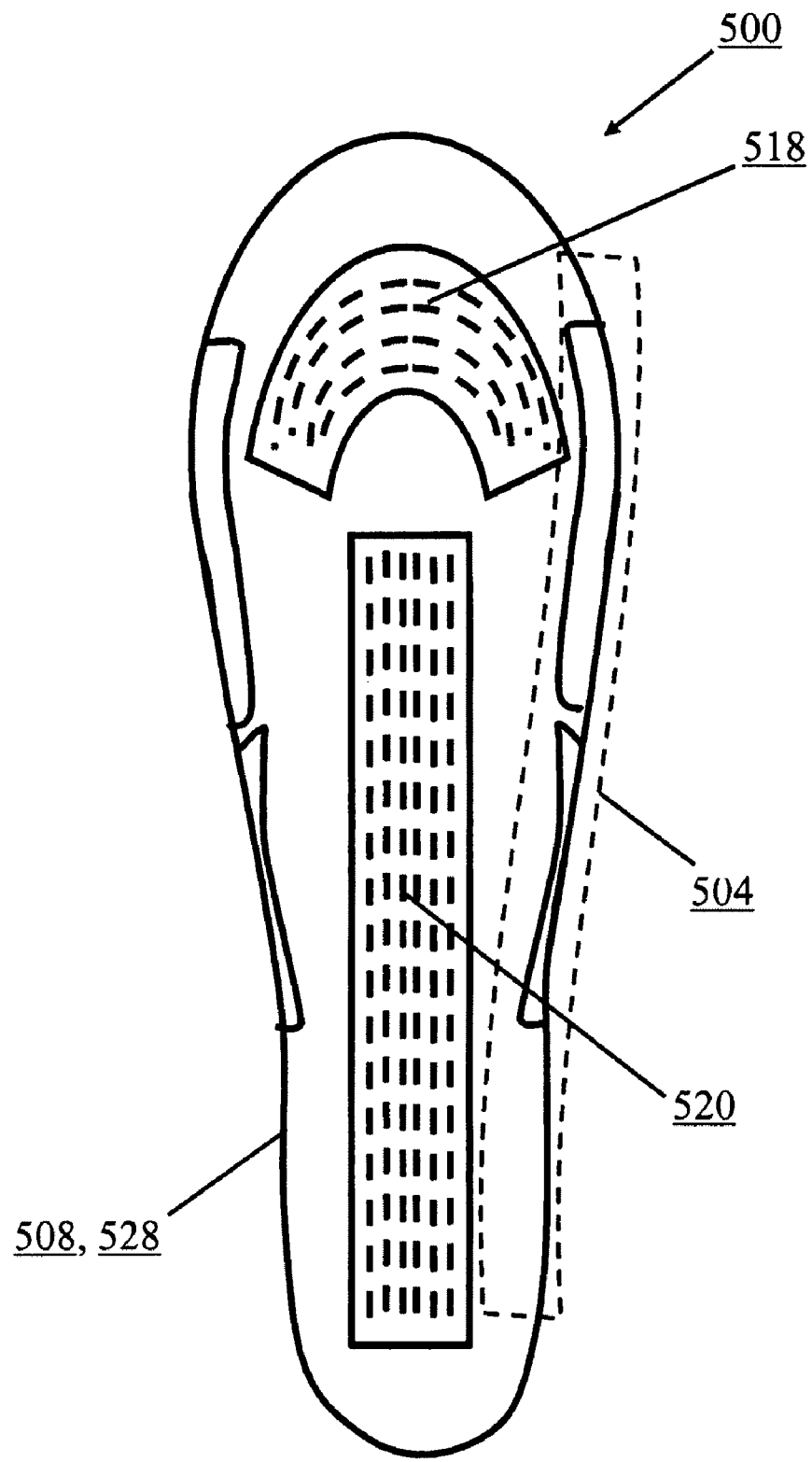

As shown in FIG. 5*b*, a rear input assembly 528 may be disposed on the back surface 308. In this implementation, the front input assembly 526 (FIG. 5*a*) is disposed relative to the rear input assembly 528 to take advantage of the opposition of the human thumb and finger. Alternatively, a user may flip over the input accelerator device to use the rear input assembly his thumb instead of his fingers. The rear input assembly 528 may include two sensor arrays configured in software to represent one or more delineated active areas corresponding to different programmable functions depending on the application. The sensor arrays may include a ring-shaped curved sensor array 518 and a strip-shaped linear sensor array 520. The curved sensor array 518 may be implemented to be swept sideways along a natural freedom of motion of a thumb (or finger) to map horizontal cursor movements. In addition, the linear sensor array 520 may be swept vertically using the thumb (or finger) to map vertical cursor movements or control the scroll bar in a long selection list. The curved 518 and linear 520 sensor arrays in this implementation may include an actuator, such as an elastomeric material, attached to a force sensitive resistor array, a capacitive mat or array, or other similar pressure sensitive device or grid that can provide multiple outputs corresponding to the pressure readings of a plurality of active areas on the sensor arrays. In another configuration of the pressure sensor arrays 518, 520, the entire surface of the sensor arrays 518, 520 may be covered by rectangular active areas interspersed between small rectangular inactive areas to achieve any desired number of active areas. Other configurations of the pressure sensor arrays 518, 520 may be realized depending on the requirements of the desired application.

Alternatively, the rear input assembly 528 can be free of sensors and the input elements on the front input surface 502 may be programmed in software to allow the user to stroke the linear sensor array 520 up or down to effect a vertical scrolling motion in list selection. This implementation facilitates the user in navigating through long lists efficiently and effectively without any additional sensors on the back. Additionally, the front 502 or back 508 input surfaces can optionally provide access to a miniature thumb joystick with analog inputs in both left-right and up-down directions. This thumb joystick can provide analog signals to control a game on the mobile phone host device 117.

Figure 5C:
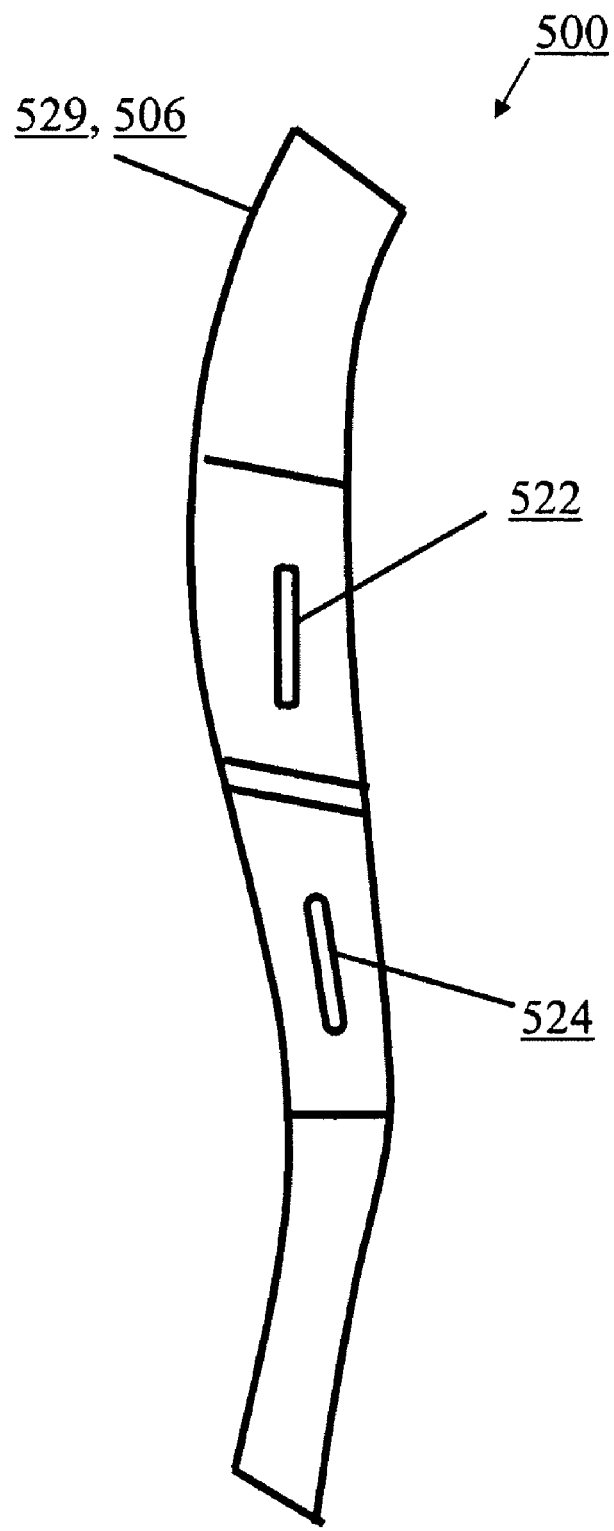
Figure 5D:
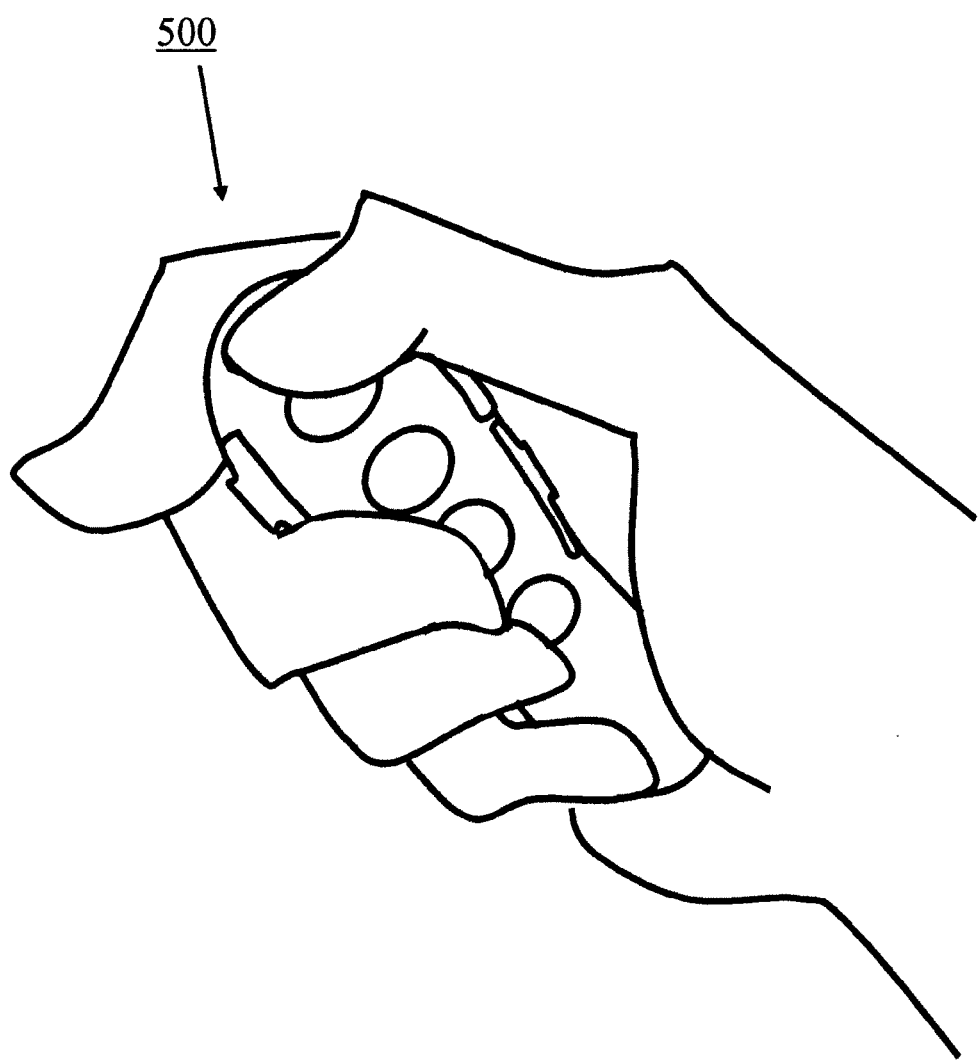

The side input assembly 529 may be disposed on the left-side surface 504 and/or the right-side surface 506 as shown in FIGS. 5*a-c*. The left side surface 504 and right side surfaces 506 of the input accelerator 300 may be implemented to include additional input or selection elements 522, 524, 526, 528, which may be used to map to other types of cellular phone functions using re-mapping techniques described above and in the co-pending U.S. patent application Ser. No. 11/221,412. The input or selection elements of the side input assembly 529 can also be implemented to effect shifting between modes. For example, holding down one of the input or selection elements 522, 524, 526, 528 may act as a shortcut key whereby a favorite application such as short message service (SMS), instant messenger (IM) or music may be activated. Holding down one of the selection elements may also act as a shortcut key to activate cellular phone functions such as phone number search and select, phone number dial, and call answer. Two of the input or selection elements 522, 524 may be implemented for left-handed users and the other two selection elements 526, 528 for right-handed users.

It is to be understood that the input elements 510, 512, 514, 516 of the front input assembly 526, the side input elements 522, 524, 526, 528 of the side input assembly 529, and the back input elements 518, 510 of the rear input assembly 528 in this implementation and any other implementation may be analog and/or digital buttons, keys, rockers (which may be a one or more position buttons or an analog joystick-type button), sliders, dials or touch pads used in combination with pressure sensors (such as force sensitive resistors, piezoelectric resistive sensors, and capacitive sensors), positional sensors (such as rotary encoders, linear potentiometers and the like), miniature analog thumb joysticks or other sensors or a combination of them.

Figure 6:
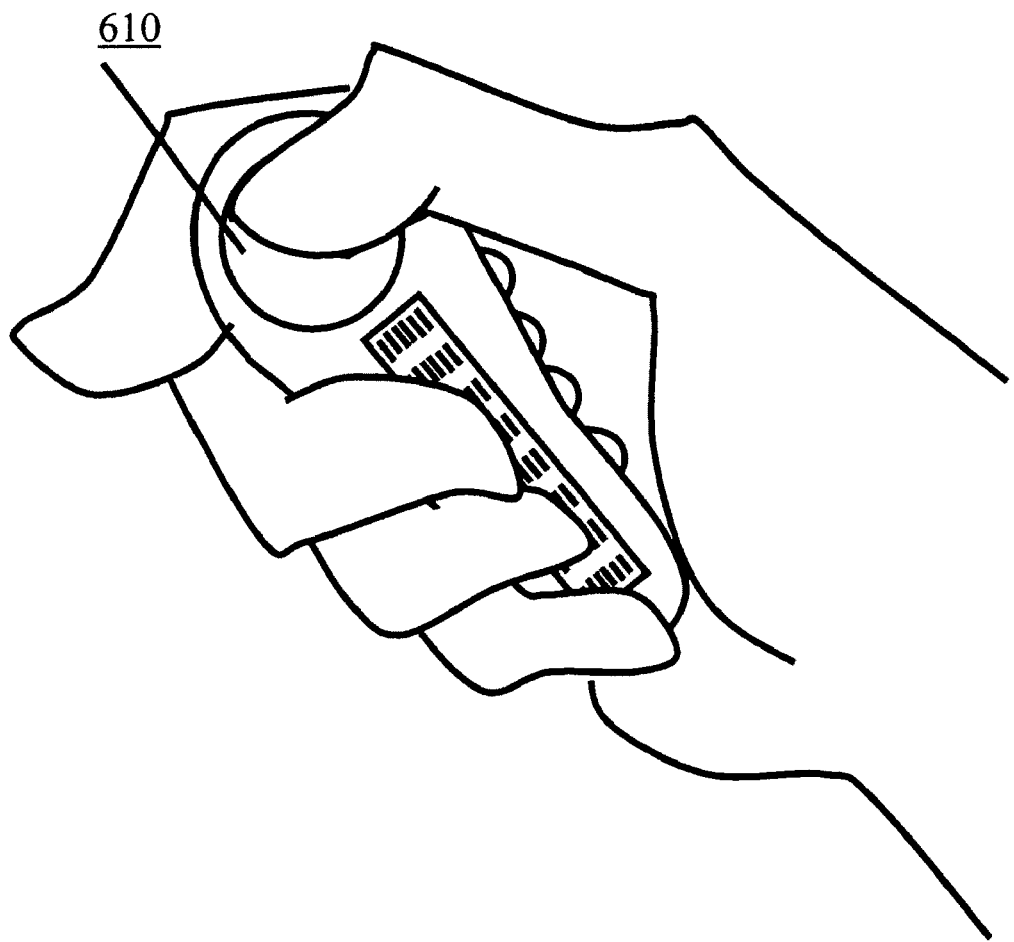
FIG. 6 illustrates an alternate implementation of the second input assembly on a hand-held input accelerator device.

FIG. 6 illustrates an alternative implementation of the rear input assembly 408. Input element 610 is implemented as a conventional rotary dial (such as the Blackberry thumb wheel), which may be used to control horizontal and vertical cursor, scroll, and/or navigation movements. In other implementations, other sensors as described above may be utilized depending upon the user age and application categories to be covered.

Figure 7A:
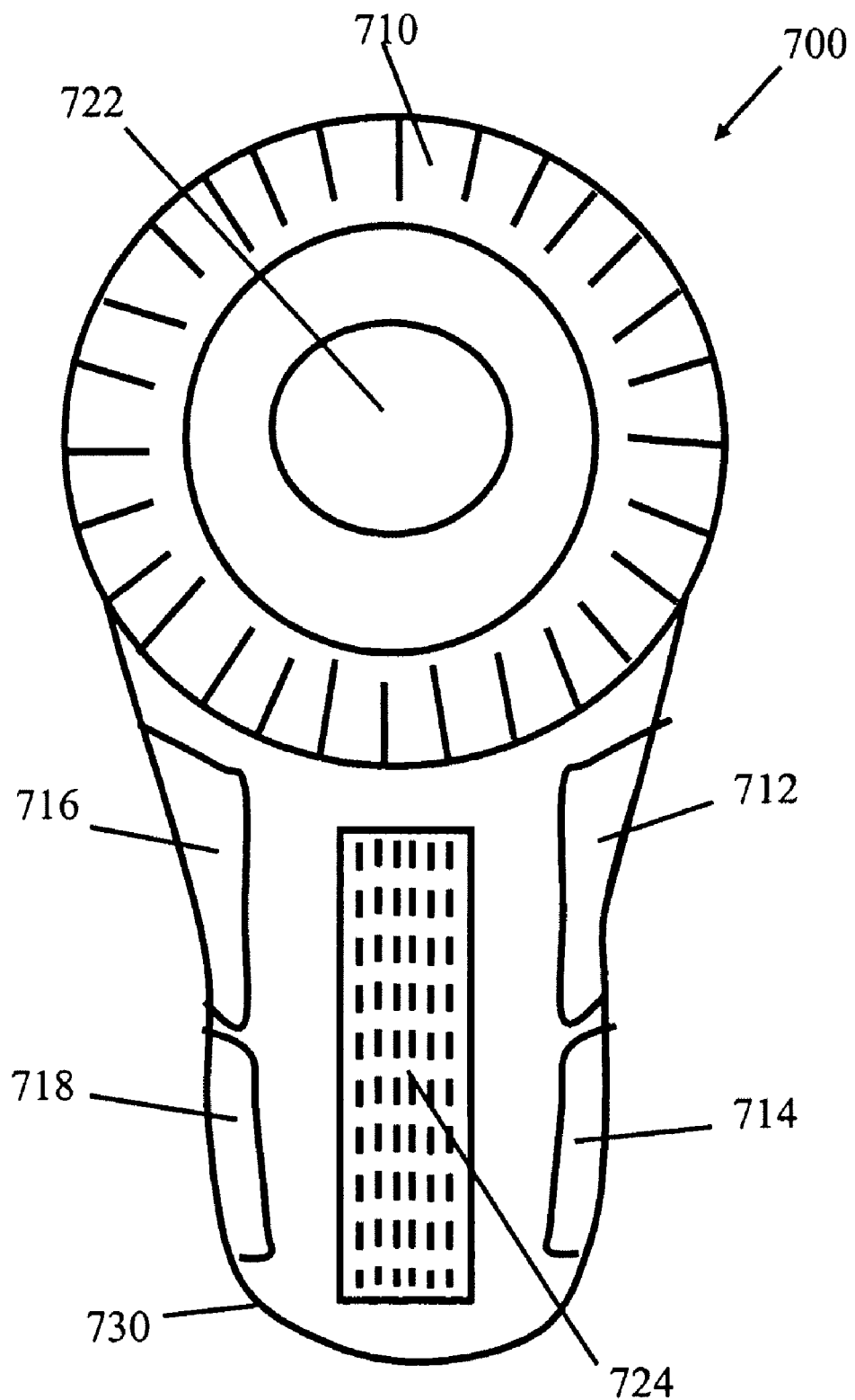
FIGS. 7a-d depict one implementation of a hand-held input accelerator device comprising a combination of a remote control and a wireless headset.

FIGS. 7*a-d* illustrates an implementation of the hand-held input accelerator device as a wireless headset. As shown in FIG. 7*a*, the headset 700 may be implemented to include a thumb wheel as input element 710 on a front surface 730 that allows the user to scroll left and right. The front surface 730 may also include multiple input elements 722, 724, which with the input element 710, comprise a front input assembly. The front input elements 722, 724 may be actuated in conjunction with the input element 710 to perform object selections while scrolling left and right.

Figure 7B:
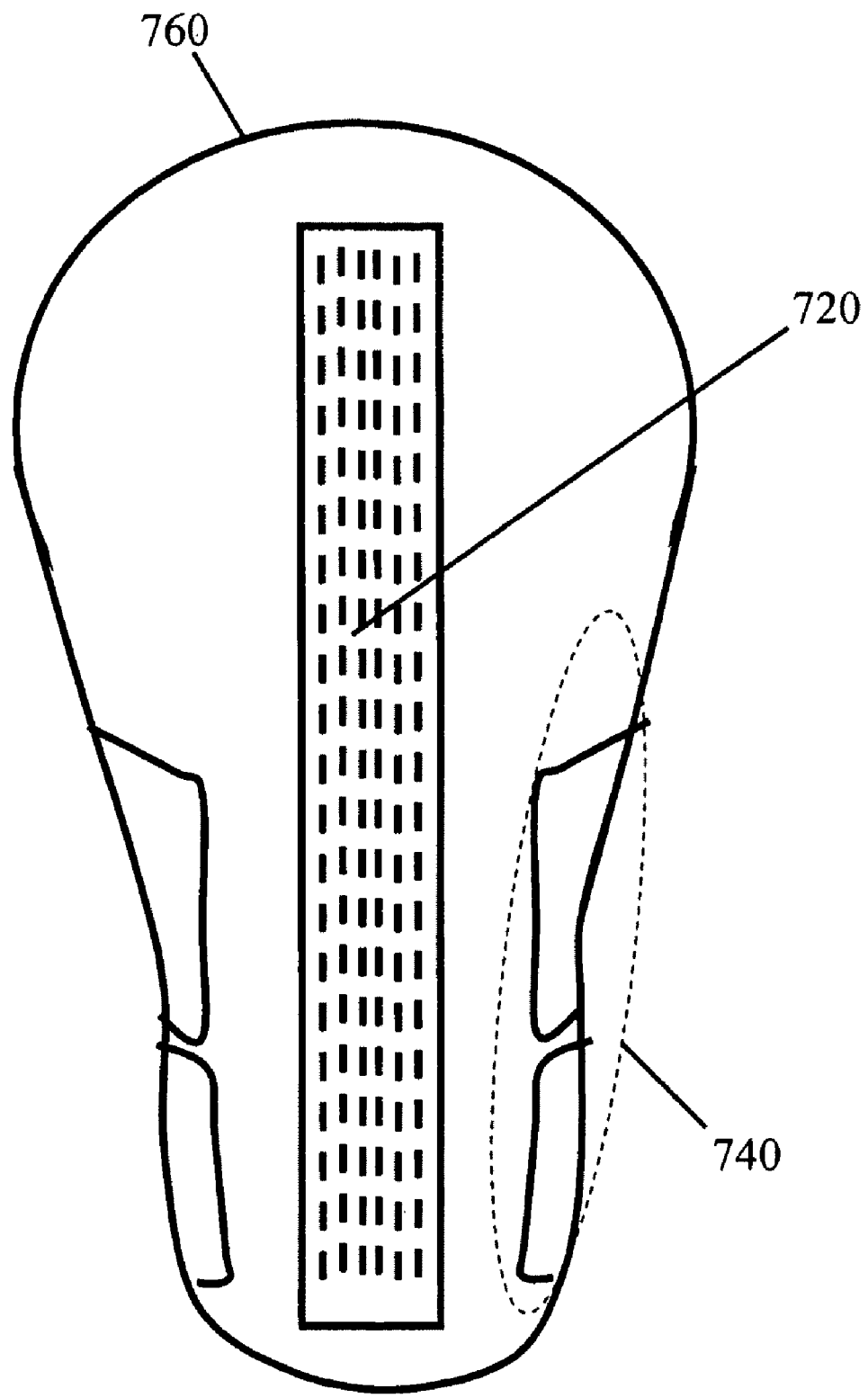

As shown in FIG. 7*b*, a back surface 760 of the headset 700 represents one implementation of a rear input assembly. The back surface 760 may include a linear sensor array 720 to facilitate vertical scrolling, selection from long lists, and navigation operations. The input elements and active areas on the four surfaces may be substantially similar to those as described above.

Figure 7C:
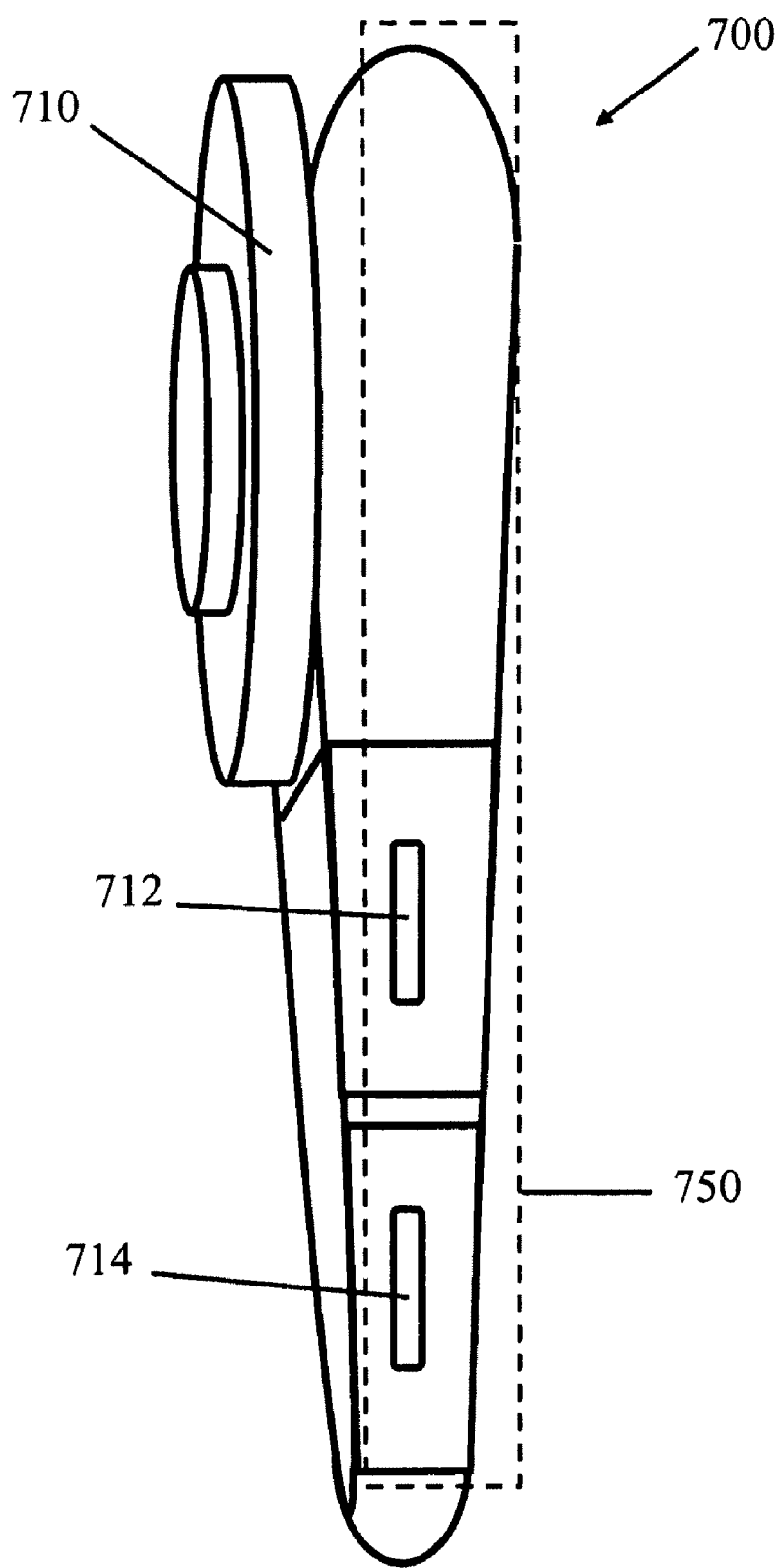

FIGS. 7*b* and 7*c* also illustrate a left side surface 740 and a right side surface 750 on which is disposed a side input assembly of the headset 700, which may be configured to include at least four side selection elements 712, 714, 716, 718 to facilitate shifting or indexing between modes and text input. The selection elements may be mapped to shortcuts to variety of functions, such as dialing and answering a call. Two of the selection elements 712, 714 may be implemented for left-handed users and the other two selection elements 716, 718 for right-handed users.

Figure 7D:
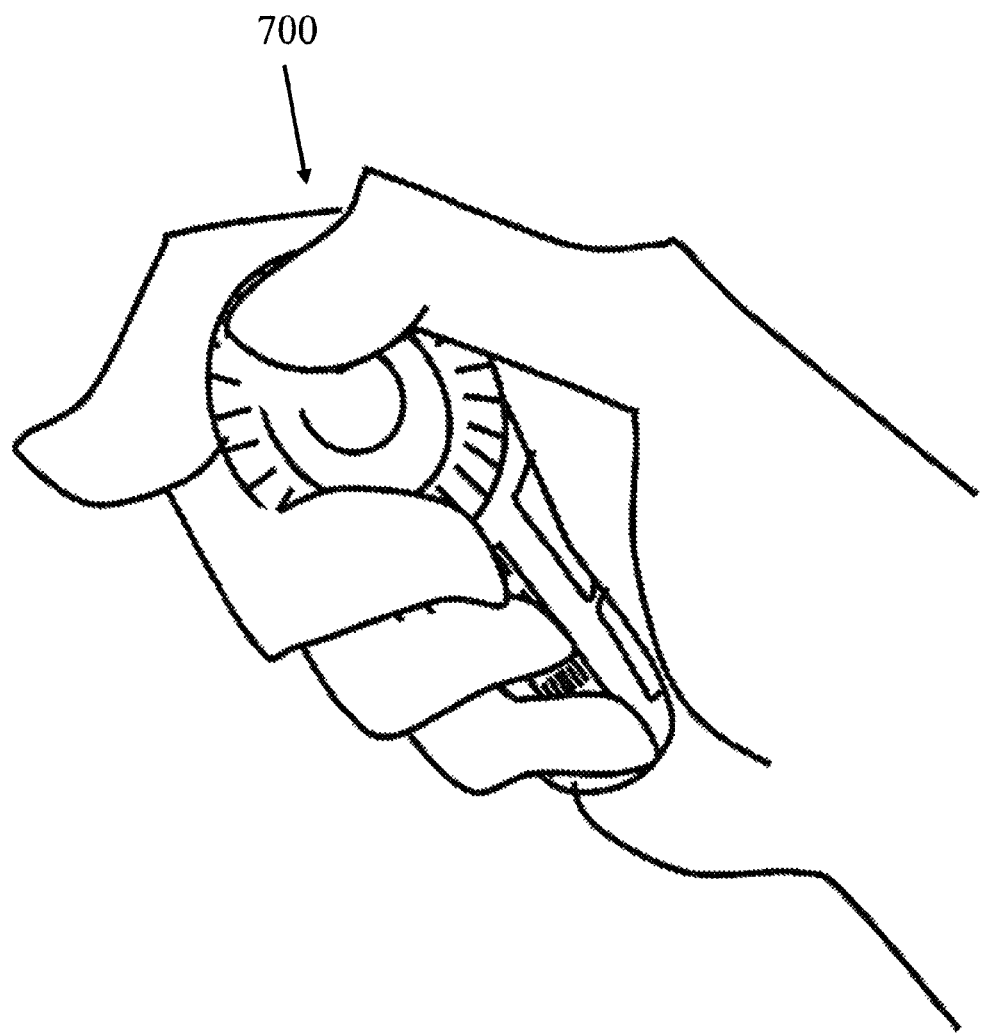

FIG. 7*d* depicts the headset 700 being used as a remote control. That is, by integrating the remote control inputs into the headset 700, a user can remotely perform all functions of one or more host hand-held electronic devices using just the headset 700 that serves multiple functions. When talking or listening to music on a host device, such as a cellular phone, the headset 700 may be use as a regular headset receiving and transmitting audio signals through a speaker (not shown) and a microphone (not shown). When inputting text, the headset 700 may be held in either or both hands and used to accelerate text entry. When executing applications on host devices, the thumb wheel 710 and the sensor array 720 may be used to navigate and scroll through long lists and icon arrays. Thus, the headset 700 with integrated remote control may be implemented to operate a host device, such as a cellular phone, without ever removing the host device from its storage location (e.g., the user's pocket, jacket, backpack or purse).

Customizing a Host Device for Specialized Use

An accessory or input accelerator device as describe in FIGS. 1-7 above can be implemented to interface with various host devices to control input functions and/or transfer data between the accessory device and the host devices. Data as used in this specification can include information needed for communication purposes, information needed for installing, starting and interacting with software applications which reside on a host device, and other types of mobile content which reside on the host device. Data for communication purposes can include: information to initiate, sustain and terminate a voice call on a mobile device (e.g. pre-programmed phone numbers, start, stop, phone book entry selection, volume control); information for sending text messages via Short Messaging Service (SMS); and locative information sent to a security service provider such as Campus Police, or a 911 dispatcher in the case of an emergency. Data for installing, starting and running applications can include actual applications delivered from the accessory device to the host device, or information required to run a variety of applications, including productivity software (e.g. word processors, messaging applications, enterprise software etc.) or gaming software (e.g. card games, casino games, driving games, first person shooter games, role playing games, etc.). Other mobile content resident on the host device can include visual content (e.g., wallpaper, pictures, etc.), music files (e.g., MP3 songs, MIDI files, WAV files, ringtones, alerts, etc.), multimedia files (e.g., video clips, etc.), address book entries (e.g., names, addresses, numbers, email addresses, etc.), calendar entries, documents (e.g., presentation files, text files, etc.), computer commands or instructions, voice data, etc. An accessory device can interface with a hand-held host device such as a mobile phone, an iPod, an MP3 player, a PDA, etc. In some implementations, the accessory device can interface with other suitable consumer electronics host devices such as a satellite radio, a lap top, a desk top, a video game console, a television, a DVD player, and a stereo system.

Figure 8:
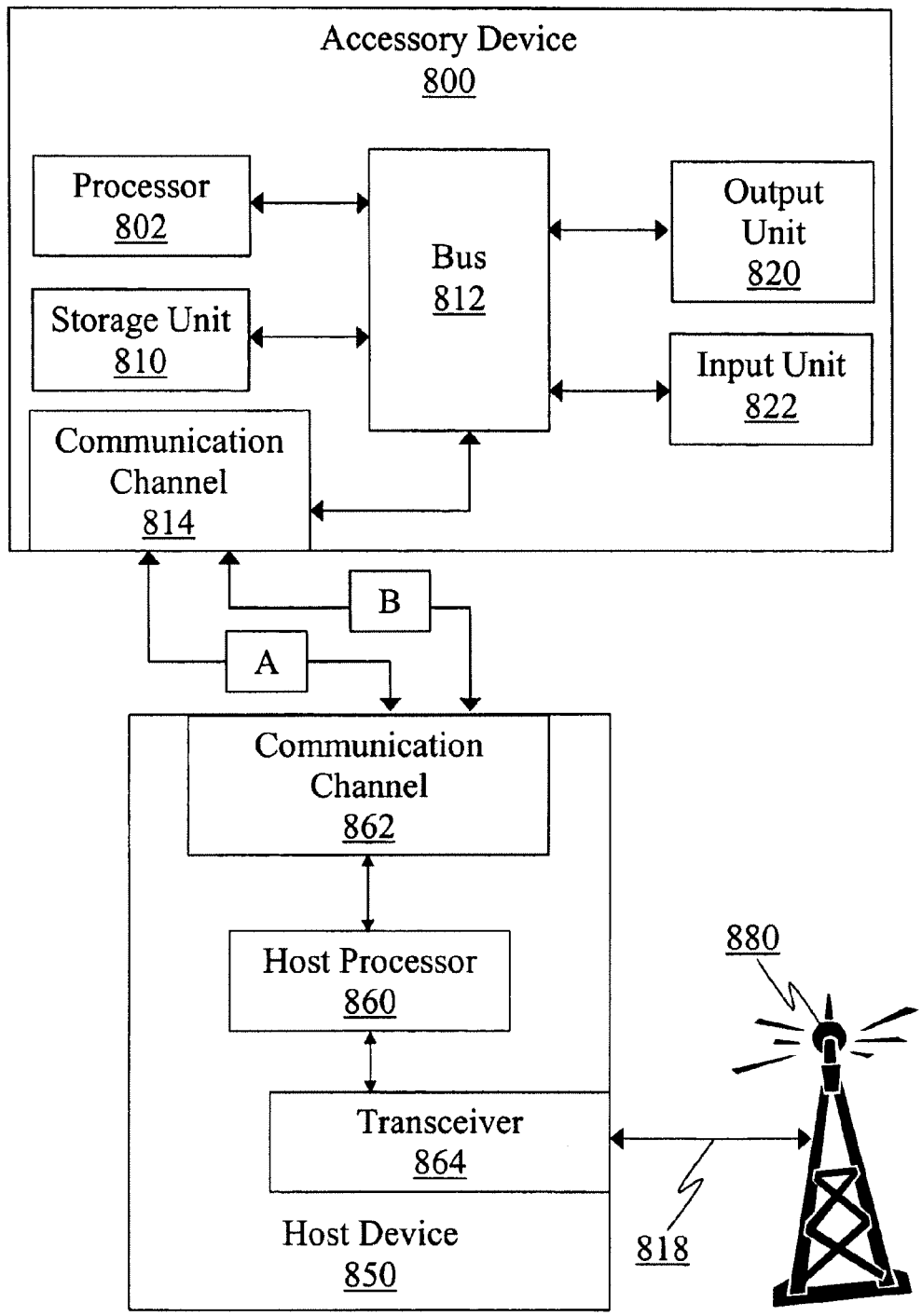
FIG. 8 is a block diagram of an accessory device for providing a customized user interface.

In one aspect, an accessory device can be implemented to provide a customized user interface for controlling a host device. The user interface can be customized to facilitate control of the host device by a special user. A special user can include a child, the visually impaired, an elderly, and other users who may benefit from a customized user interface. FIG. 8 illustrates a functional block diagram of an accessory device 800 implemented to provide a customized user interface for such a special user. The accessory device 800 as disclosed in this specification can include features similar to the input accelerators 100 and 200 described with reference to FIGS. 1-4 above. The accessory device 800 includes a processor 802, a storage unit 810, a communication channel 814, an input unit 822, and an output unit 820. These features of the accessory device 800 are communicatively connected to each other through a data bus 812. The host device 850 can include conventional mobile device features including a host processor 860, a communication channel 862, and a transceiver 864 for connecting to a mobile voice and data network 880 through an appropriate communication protocol 818.

The accessory device 800 interfaces with a hand-held host device 850 by initiating a communication link through the two communication channels 814 and 862. The communication channels 814 and 862 are compatible with various wireless communication media 830 as described with respect to FIGS. 1-4 above. For example, a wireless connection can include a WiFi, a Bluetooth, a WiMax, an IR, or a short range radio connection. The communication channel 814 is capable of establishing a bidirectional communication link between the accessory device 800 and the hand-held host device 850. In one implementation, the communication channel 814 includes two separate channels, one for voice data (A) and one for non-voice data (B). In an alternative implementation, the communication channel 814 can transmit both voice and non-voice data using a single channel.

The input unit 822 can be implemented to include an input assembly having multiple user input elements. As described with reference to FIGS. 1-7d above, the input assembly can be designed to include multiple input assembly units with each input assembly unit disposed on a different surface of the accessory device 800. The user input elements can be selectively mapped to multiple user input functions using methods described with respect to FIGS. 1-7d above. Mapping the user input elements can be performed to provide a customized user interface for controlling the host device 850.

FIG. 9 illustrates one implementation of an accessory device 900 having customized user input elements 910. The customized user input elements 910 are implemented to map to selected input functions of the host device 950. When a user activates one of the user input elements 910 selectively mapped to the selected input functions, a communication link 920 is established for transferring data between the accessory device 900 and the host device 950. The data transferred can include input signals corresponding to the activated input element. When the host device receives the input signals transmitted from the accessory device, the host processor 860 interprets the received input signals and activates any necessary application for executing the input functions of the host device 950.

Figure 9A:
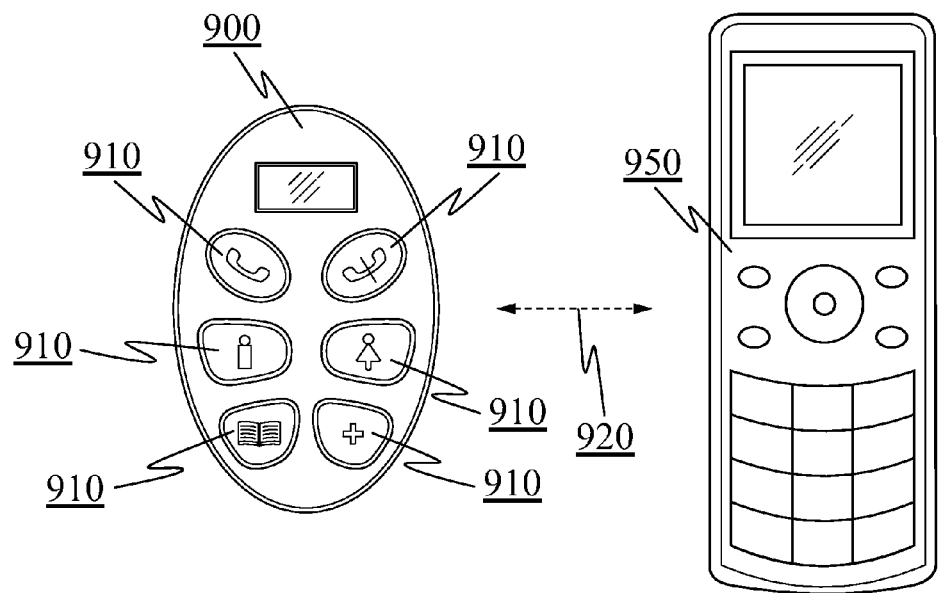
FIGS. 9a-b depict one implementation of an accessory device having customized user interface.
Figure 9B:
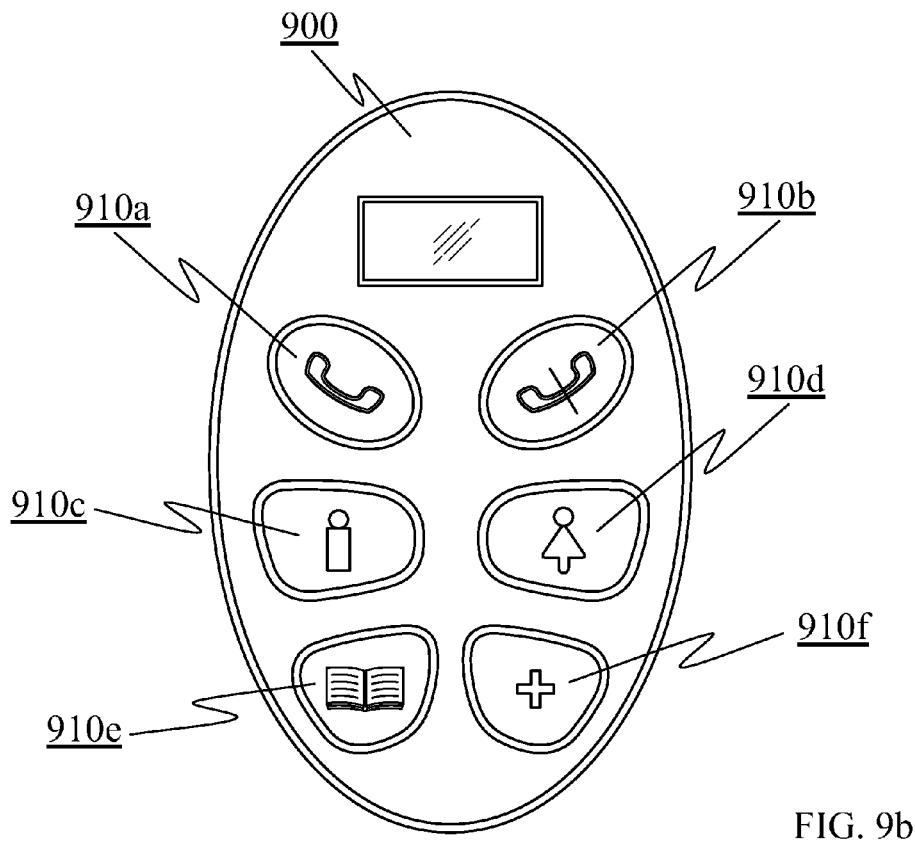

An end user can determine and select the input functions to be mapped to the input elements. FIG. 9b illustrates a detail view of the accessory device 900 having input elements 910a-f customized for a child to control a select number of input functions of the host device 950. For example, the input elements 910a-f of the accessory device 900 can be mapped to selected input functions of the host device 950, using mapping techniques as described with reference to FIGS. 1-7 above, to simplify the user interface for a child's use. The selectively mapped input functions can include for example: 1) Start Call 910a; 2) End Call and Power On/Off 910b; 3) Call Mommy 910d; 4) Call Daddy 910c; 5) Access Phone Book 910e; and 6) Emergency/Panic 910f. As shown in FIG. 9b, the user input elements 9a-f can include visual indicators (e.g., Call Mommy button 910d is displayed using an icon resembling a female figure in FIG. 9b. A parent can preprogram the phone book button 910e to include a short list of phone numbers (e.g. babysitter, grandparents) to restrict the outbound calls from a child's mobile handset (i.e., the host device 950). The Phone Book 910e includes at least those phone numbers not directly mapped to the input elements 910a-f. The emergency/panic input element can be programmed so that the child has to hold down the emergency/panic input element for a given period of time before automatically dialing 911. This predetermined hold down period can be applied to prevent false alarms due to accidental actuations of the emergency/panic input element 910f. In addition, the accessory device 900 can be designed to emit a loud warning sound whenever the 911 call is issued to serve as a deterrent should a child find himself in a challenging situation.

Figure 9C:
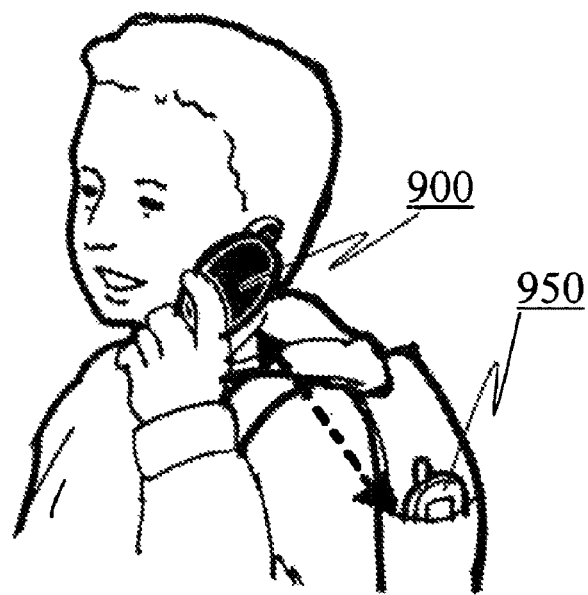
FIGS. 9c-d illustrate an accessory device for controlling voice communication functions of a host device.
Figure 9D:
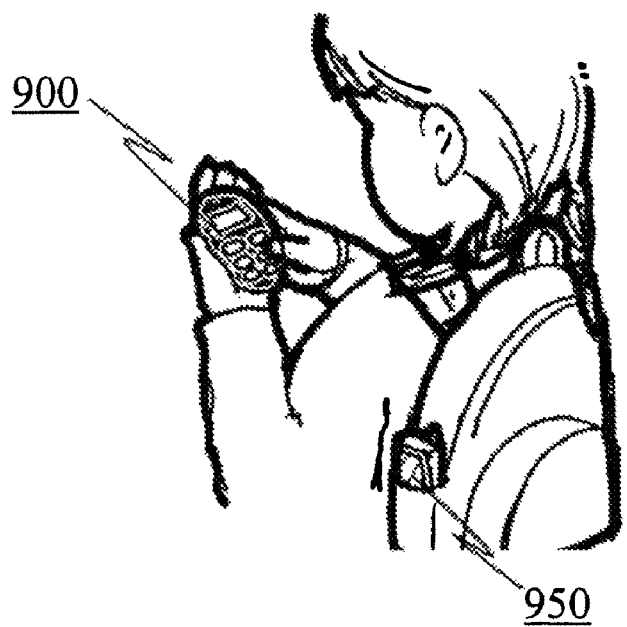
Figure 9E:
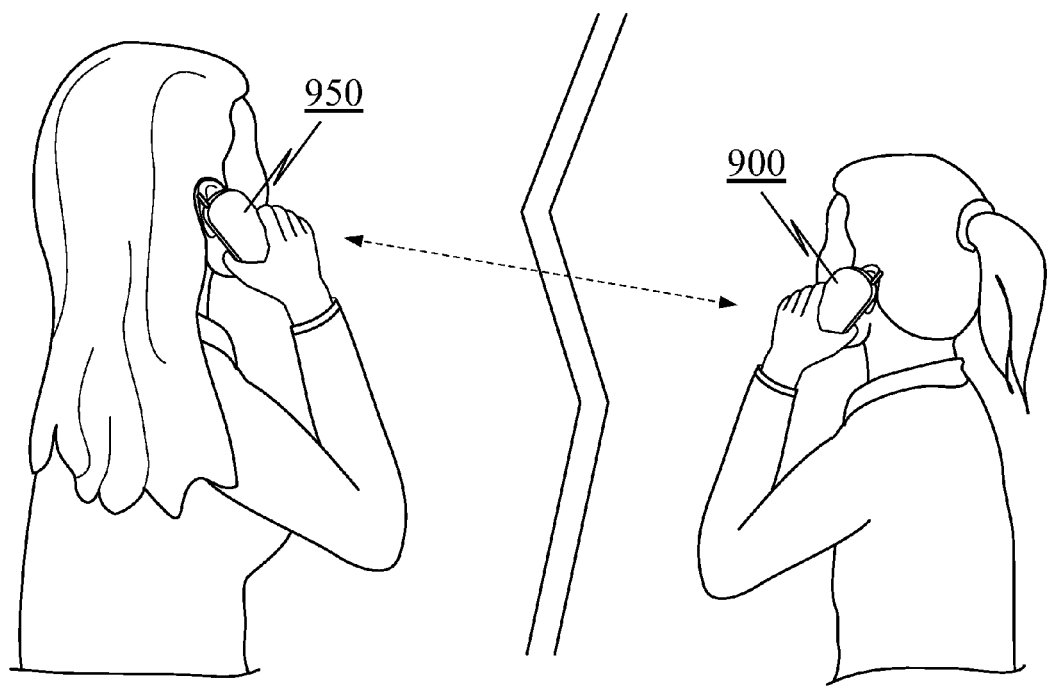
FIG. 9e depicts an accessory device customized to include a short radio transceiver for communication with a host device or an additional accessory device.

Before programming the input elements 910a-f to map to the above described or other input functions of the host device 950, a communication link may be established between the accessory device 900 and the host device 950 to verify and initialize appropriate system settings for both devices. Once the accessory device 900 is customized as described above, a child need not interface with the host device 950 (e.g., mobile handset) in order to make a call. In fact, the child can keep the mobile handset 950 in his/her backpack or elsewhere when making a call to his/her mom or dad, provided the mobile handset 950 is within the operating range of the communication link between the accessory device 900 and the mobile handset 950. To facilitate making phone calls using the accessory device 900 directly, a microphone (not shown) and a speaker (not shown) can be included with the accessory device 900. For example, a microphone can be included in the input unit 822 (See, FIG. 8) and a speaker included in the output unit 820 (See, FIG. 8). FIG. 9c shows a child using the accessory device 900 to make a phone call while the host device 950 (e.g., the mobile handset) is stored away in the backpack. In some implementations, the accessory device 900 can also include a speakerphone when making a phone call as shown in FIG. 9d.

In one aspect, an accessory device 900 as described in this specification can be implemented to perform function related to (1) voice communication between an accessory device and a host device or one or more additional accessory devices; (2) transmitting data, as described in this specification, between an accessory device and a host device or one or more additional accessory devices using a wireless communication link; and (3) short range voice communication between an accessory device and a host device or one or more additional accessory devices through the same wireless communication link used to transmit data. The wireless communication link can include any conventional wireless protocols, such as Bluetooth and in accordance with those described in this specification. For example, an accessory device 900 can be implemented to take advantage of the wireless communication mechanism used to transmit data between the accessory device and the host device. The communication channel 814 (See, FIG. 8) can be implemented to exchange voice data over a short range between the accessory device 800 and the host device 850 in addition to the data transmitted between the devices. This allows the accessory device to function as an walkie-talkie device without having to include a short range radio communication mechanism. By utilizing the same communication channel to perform both voice and data transfers, the accessory device can be designed as a simpler, cost efficient device. The walkie-talkie feature can be useful in communicating with one or more persons without accessing the cellular network and incurring costly air time charges. The walkie-talkie feature can also be useful when the cellular network coverage is poor. In addition, the walkie-talkie feature can be useful for a parent to quickly communicating with his/her child nearby but out of view (e.g., in the next building). The parent's mobile handset 950 can be in communication with multiple accessory devices 900 in walkie-talkie mode. In such implementations, each child can be issued the accessory device 900 only and not the mobile handset 950. When the parent and his/her children wish to communicate, they can simply talk to each other over the short range wireless connection (e.g., each child communicating with the accessory device 900), without incurring air time charges. The accessory device 900 and the host device 950 can be designed to provide a warning signal, such as a beep, to alert the parent and child the devices are moving out of range from each other.

In one implementation, the same design can cover both the long range communication needs of a child physically removed from the parent, such as when he or she is on a field trip and the parent is at work; and the short range communication needs of parent and child while they are close but not within ear shot of each other. An accessory device 900 equipped with a wireless link such as a Bluetooth link may be used in one of two modes—the first mode operates the host device 950 to make calls over the cellular network, servicing the child's long range communication needs; the second mode establishes a walkie-talkie connection between the accessory device 900 held by the child, and the host device 950 held by the parent, servicing the parent and child's short range communication needs.

Having multiple accessory devices 900 in communication with a host device 950 can be useful in other instances. For example, a group of children traveling together on a field trip under the supervision of an adult (e.g., a teacher) can communication with each other using this implementation. The supervising adult can be equipped with the host device 950 (e.g., a conventional mobile handset), and each of the children can be equipped with an accessory device 900 in walkie-talkie mode. By relying on voice communication and a warning indicator (as described above), the supervising adult can keep track of all children with ease. Such an implementation can be applied in various settings, such as in a crowded mall, a sports arena, etc.

In some implementations, the accessory device 900 is implemented to incorporate special product design elements to appeal to the aesthetic desires of children or other target demographics. For example, licensed characters (e.g., cartoon characters) can be incorporated into the design of the housing for the accessory device 900. The design elements can make the accessory device 900 more attractive to children. FIG. 9 shows two accessory devices 900 having different design elements.

In some implementations, the accessory device 900 is pre-packaged with application software, such as a game application, together with appropriate user interface elements to run the gaming software. For example, the accessory device 900 could include a visual display (not shown) and gaming controls (not shown). In such implementations, the accessory device 900 can also function as a hand held gaming device. Alternatively, the accessory device 900 could include gaming controls (not shown) that can be used to control games running on a host device (950). In such implementations, the gaming application may be delivered from the accessory device 900 to the host device 950 in its entirety, or the gaming application may run partially on the accessory device 900 and partially on the host device 950, with a real time bidirectional data link maintained between the two for the duration that the game is running. Further detail of this implementation may be found in co-pending U.S. patent application Ser. No. 11/519,455 filed concurrently with the present disclosure, which is incorporated by reference in its entirety.

Figure 9F:
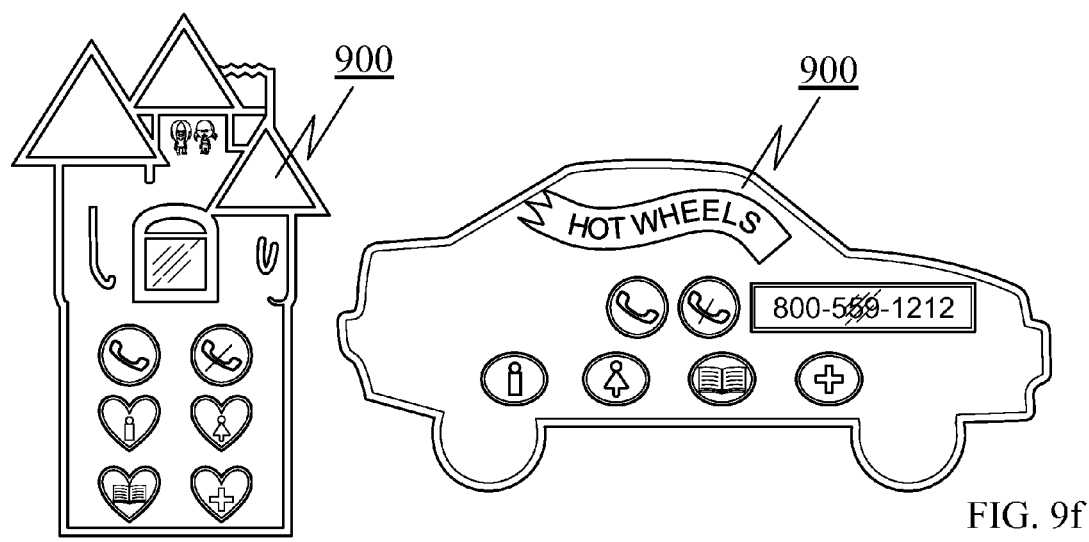
FIG. 9f depicts an accessory device customized to include a specialized form factor.
Figure 9G:
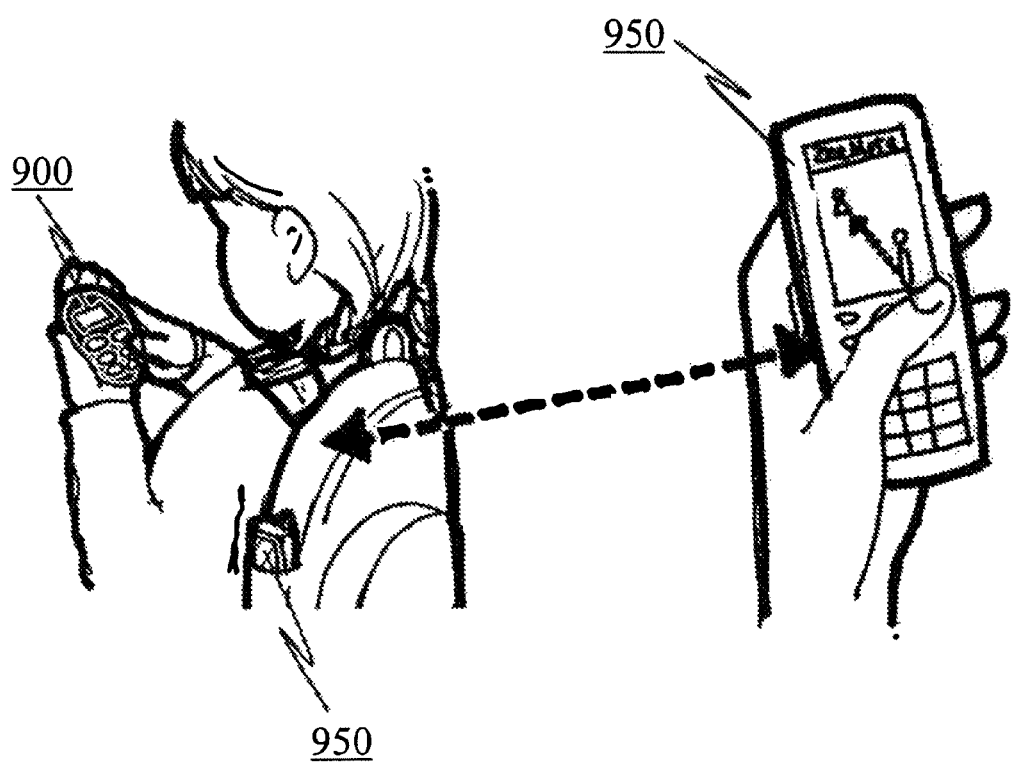
FIG. 9g illustrates an accessory device customized to include a global positioning system (GPS) unit.

In some implementations, the accessory device 900 is designed to include a global positioning system (GPS) unit that may allow the parent to locate and track the movement of children. The GPS unit can be implemented in conjunction with the walkie-talkie feature to enhance the ability of the parent to keep track of his/her children and to instantly communicate with them. FIG. 9*f* illustrates the GPS implementation. A parent equipped with a mobile handset 950 can search for and identify the location of his/her child carrying a accessory device 900. Further detail of this implementation may be found in co-pending U.S. patent application Ser. No. 11/519,446 filed concurrently with the present disclosure, which is incorporated by reference in its entirety.

An accessory device as described in this specification can be designed to benefit segments of the population other than young children. For example, elderly people with reduced visual acuity could benefit from a accessory device designed with oversized buttons mapped to input functions of a conventional mobile handset. Alternatively, people suffering from diminished language or communication skills may benefit from using a simplified version of an accessory device with simple buttons mapped to input functions that instantly establishes a communication link with either a host device or another accessory device in possession of a caregiver. Further, People with diminished verbal skills can be equipped with an accessory device having customized user input elements optimized for text-messaging.

Moreover, the input accelerator device described herein can be implemented as a "Master" device in communication link with multiple "Slave" or host devices. The user can easily switch from one host device to another easily just by selecting the desired host device from a list of host devices that may be displayed on a screen or LC disposed on the input accelerator device. For example, a user can selectively control a host device, such as a cellular phone, to answer a phone call using the input accelerator device. While talking to the caller using the headset 700, the user can put the caller on hold and look up an e-mail address from another host device, such as a PDA by selectively controlling the PDA. After retrieving the e-mail address, the user can return to the phone conversation by selectively switching back to controlling the cellular phone.

In any of the above implementations, active and/or passive tactile feedback may be implemented. To provide passive tactile feedback, the input elements of the first and/or second input assemblies may be combined with a palpable detent, such as a dome cap or dome spring so that a user can tactilely perceive, through his fingers or thumbs, activation and/or deactivation of an input element. In one implementation, among others, the palpable detent may be positioned between the actuator and sensor components of the input elements. To provide active tactile feedback, one or more vibratory units or force producing units may be mounted in the hand-held electronic device and activated to provide tap or index level or other information to a user. The vibratory unit may be an electric motor with an eccentric mass attached to the motor's shaft, a solenoid, a variable reluctance device, a loud speaker or any other vibrator that can provide tactile feedback. A force producing unit may be a solenoid in non-vibratory mode, a motor, non-vibratory actuators or any other actuator that can produce forces. A vibratory unit and/or force producing unit may be provided for each input element. In that case, the vibratory unit and/or force producing unit may be mounted below the input element so that when the vibratory unit and/or force producing unit is activated, the vibratory unit and/or force producing unit can push out the surface of the electronic device to a different level or position depending on the information to be communicated. Thus, in implementations using a pressure sensor pad or touch-pad as the input element, a stepped array may be configured to indicate higher and higher levels of index positions across the touch pad or pressure sensor pad. The vibratory units and/or force producing units may also be used to provide tactile feedback to indicate the momentary achievement of an objective, such as target lock in game applications. Tactile feedback may also be accomplished by actuators, such as a solenoid, which changes the stiffness of the input element electronically or pushes against the user's hand or fingers to indicate an event of interest in the software application.

The computational aspects described here can be implemented in analog or digital electronic circuitry, or in computer hardware, firmware, software, or in combinations of them. Where appropriate, aspects of these systems and techniques can be implemented in a computer program product tangibly embodied in a machine-readable storage device for execution by a programmable processor; and method steps can be performed by a programmable processor executing a program of instructions to perform functions by operating on input data and generating output.

The systems and techniques described above may utilize the biomechanics of the thumb and fingers, i.e., it uses the function of opposition, the fine motor control of the fingers, and the larger range of motion and stronger actuation provided by the thumb. By using the fingers and thumb in concert, the number of taps and time needed to accomplish a given function is reduced, the accuracy is improved, and the natural programming inherent in the human hand replaces the training required for other systems.

A number of implementations have been described. Other implementations may include different or additional features. For example, other configurations of the one or more input elements of the front, rear and side input assemblies may be realized. Also, the input accelerator devices described herein may have more or less than six planar or contoured surfaces. Moreover, the number of input elements in the input assemblies are not limited to the number of input elements described in the implementations above. Also, the one or more input elements of the input assemblies may be any input or selection type known to one of skill in the art, such as keys, buttons, touch pads, other types of pads, rockers, sliders, dials, contact sensors or other actuators associated with any sensor. Each sensor associated with an actuator may include digital momentary on/off switches or analog sensors, such as pressure sensors (e.g., force sensitive resistors, piezoelectric film sensors, or capacitive sensors), or positional sensors (e.g., rotary or linear potentiometers or encoders), or other analog sensors known to those of ordinary skill, or accelerometers or gyroscopes. The input assemblies may include a combination of these different types of input or selection elements, which may be mounted in the configurations shown in the figures or imbedded within the device to permit control through motion of the overall device.

Further, other implementations of the hybrid auxiliary input acceleration device are possible. People already carry around existing accessory devices, which can be instrumented with additional sensors to provide additional input signals to the host device for input acceleration. Devices carried in the purse, in the wallet, or on a keychain are ideal because these devices already serve another primary function, and providing input acceleration via these devices may result in a convergent accelerator device that substantially improves user experience without increasing the number of items that a person needs to carry around. Like the standalone remote control implementation, these convergent input accelerator devices may communicate with the host device wirelessly through a Bluetooth protocol or wirelessly through a rough-line-of-sight infrared link. Alternatively, the convergent input accelerator devices may physically plug into the host device via connectors already present in the host device, such as a headset jack or one of many data ports described above.

In another implementation, the auxiliary input accelerator device may be a car key with a remote keyless entry device, which is a common device that most people carry on their keychain. The remote keyless entry device already has a button, a radio frequency (RF) link, and an on board processor to transmit security information from the remote keyless entry device to a host vehicle to open a door, window, or a trunk; alter climate control settings; or control any other vehicle functions remotely. Most remote keyless entry devices are also small in size and possess comfortable form factor. One or more input assemblies including buttons, touchpads, or continuous sensor strips may be integrated into the remote keyless entry device to convert it into a hybrid device, which may function as an input accelerator device for a host device. The hybrid remote keyless entry input accelerator device can communicate with the host device using a Bluetooth protocol, a long range RF protocol, or Infrared protocol.

In yet another implementation, the auxiliary input accelerator device may be a remote garage door opener. While these remote openers typically tend to be clipped to the visor in a car, they can also be more miniature in size and carried on a keychain. These devices can easily be augmented to have buttons and sensors appropriate for use as an input accelerator device for host device.

In one implementation, the auxiliary input accelerator device may be a programmable radio frequency identification (RFID) keyfob. Today, many workers gain access to their secure workplace via an RFID keyfob. The circuitry in such a keyfob may be housed inside an input accelerator with buttons, sensor arrays and a wireless communication protocol to be used as an auxiliary input accelerator device to the host device.

In another implementation, the auxiliary input accelerator device may be a smartcard. In Europe and Asia, contactless, wireless smartcards based on similar technologies as the RFID keyfob are increasingly being used for a variety of commerce transactions. For example, in District of Columbia Metro Subway System, every terminal is smartcard enabled and people can pay for their subway rides by waving their wallet containing a prepaid smartcard in front of a grounded receptor. Such smartcard may be incorporated into an input accelerator device that may be carried on a keychain. Thus, the smartcard input accelerator may be used to augment interactions with a host device as well as serve as the primary mode of identification and payment in everyday life.

In yet another implementation, the auxiliary input accelerator device may be a universal remote control device. A pocket size universal remote control device with soft keys may be configured to control all standard home entertainment devices such as televisions, DVD players, VHS players, and sound systems in addition to a host device such as a cellular phone. He universal remote control device may either use the same infrared link to communicate with home entertainment devices and with the cellular phone, or it may communicate with the cellular phone using another wireless protocol, such as Bluetooth protocol.

In yet another implementation, the auxiliary input accelerator device may be a digital wristwatch incorporating the functionality of the input accelerator device. Digital wrist watches, especially running or exercise watches, typically have a digital display and a number of buttons for tracking lap times, heart rate and other important biostatistics. They also typically have a larger surface area than typical wrist watches. These watches may readily be programmed and retrofitted with optional additional sensor arrays to be used as an input accelerator for the host device.

In one implementation, the auxiliary input accelerator device may be an MP3 device such as an iPod. While multimedia content delivery on the mobile platform is becoming a norm, currently many people still carry a separate MP3 player for listening to music. The iPod or other MP3 players already incorporate sensors and buttons, which may be easily augmented to be used as the input accelerator device for interfacing with the host device, such as a cellular phone. The MP3 player may connect to the host device using an existing or added wireless protocol, such as Bluetooth.

In one implementation, the auxiliary input accelerator device may be an ultimate wireless converged remote controller device. Some or all of the above implementations may be combined into a single converged input accelerator device, The form factor of the device may be a keyfob form factor to go on a key chain, a wrist watch form factor to go on the wrist, or any other miniature form factor that facilitate portability. The ultimate converged remote controller device may perform all of the following functions in addition to controlling any additional devices possessing a short or long range wireless link. The ultimate converged remote controller device may function as an input accelerator for cellular phones, with keys and optional sensor arrays; a remote keyless entry device with a long range RF circuitry; a remote garage door opener; a RFID keyfob with a short range passive RF circuitry; a smartcard for identification and commerce with a short range passive RF circuitry; an universal remote controller device for home entertainment systems; and/or any other auxiliary functions people may want to incorporate.

Moreover, the methods to provide data input, device control or game control may be performed in a different order and still achieve desirable results. Accordingly, other implementations are within the scope of the following claims.

What is claimed is:

1. An accessory device for interfacing with a mobile host device, the accessory device comprising:
 a communication channel operable to establish a bi-directional communication link between the accessory device and the host device; and
 an input assembly operable to interact with an input mapping application, the input mapping application being operable to utilize user input to customize a mapping between one or more input elements of the input assembly and one or more functions of a host device software application.

2. The accessory device of claim 1 further comprising a processor operable to execute the input mapping application.

3. The accessory device of claim 1 wherein the input mapping application is executable on the host device.

4. The accessory device of claim 2 wherein the input mapping application is operable to receive user input provided by user actuation of input elements of the input assembly of the accessory device.

5. The accessory device of claim 3 wherein the input mapping application is operable to receive user input provided by user actuation of input elements of the host device.

6. The accessory device of claim 1, wherein the input assembly is arranged to optimize a biomechanical effect of a human user's opposing thumb and fingers.

7. The accessory device of claim 6 wherein the input assembly comprises at least one input assembly on a first surface of the accessory device and at least one input assembly on a second surface of the accessory device.

8. The accessory device of claim 1 wherein the input mapping application is operable to customize a mapping between input elements of the input assembly and functions common to a group of host device applications.

9. A method of interfacing with a mobile host device, the method comprising:
 providing a communication channel for establishing a bidirectional communication link between an accessory device and the mobile host device;
 utilizing user input to customize a mapping between one or more input elements of an input assembly of the accessory device and one or more functions of a host device software application.

10. The method of claim 9 wherein utilizing user input to customize the mapping is performed by an input mapping application executed on the accessory device.

11. The method of claim 9 wherein utilizing user input to customize the mapping is performed by an input mapping application executed on the host device.

12. The method of claim 11 wherein the input mapping application receives user input provided by user actuation of input elements of the input assembly of the accessory device.

13. The method of claim 11 wherein the input mapping application receives user input provided by user actuation of input elements of the host device.

14. The method of claim 9 wherein the input assembly is arranged to optimize a biomechanical effect of a human user's opposing thumb and fingers.

15. The method of claim 14 wherein the input assembly comprises at least one input assembly on a first surface of the accessory device and at least one input assembly on a second surface of the accessory device.

16. The method of claim 9 wherein user input is utilized to customize a mapping between input elements of the input assembly and functions common to a group of host device applications.

* * * * *